US008082231B1

(12) United States Patent
McDaniel et al.

(10) Patent No.: US 8,082,231 B1
(45) Date of Patent: Dec. 20, 2011

(54) TECHNIQUES USING IDENTIFIERS AND SIGNATURES WITH DATA OPERATIONS

(75) Inventors: Matthew R. McDaniel, Tyngsboro, MA (US); Arthur Beaverson, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 1151 days.

(21) Appl. No.: 11/525,647

(22) Filed: Sep. 22, 2006

(51) Int. Cl.
*G06F 7/00* (2006.01)
*G06F 17/30* (2006.01)

(52) U.S. Cl. ........................................................ 707/681

(58) Field of Classification Search .................. 707/681
See application file for complete search history.

(56) References Cited

U.S. PATENT DOCUMENTS

| | | | | |
|---|---|---|---|---|
| 5,737,594 | A | 4/1998 | Williams | |
| 6,134,597 | A | 10/2000 | Rieth et al. | |
| 6,704,730 | B2 | 3/2004 | Moulton et al. | |
| 6,810,398 | B2 | 10/2004 | Moulton | |
| 7,685,171 | B1 * | 3/2010 | Beaverson et al. | 707/999.202 |

OTHER PUBLICATIONS

Apvrille et al., “A Time Stamped Virtual WORM System”, In: Workshop SECI02 Securite de la Communication sur Internet, pp. 93-104, Sep. 2002.*

*Redundancy Elimination Within Large Collections of Files*, Purushottam Kulkarni, et al., Proceedings of the 2004 USENIX Annual Technical Conference, Boston, MA, Jun. 2004 (pp. 1-14).

*Efficient Algorithms for Sorting and Synchronization*, Andrew Tridgell, Doctoral Thesis, The Australian National University, Feb. 1999 (115 pages).

*Venti: A New Approach to Archival Storage*, Sean Quinlan, et al.

*Semantically-Smart Disk Systems*, Muthian Sivathanu, et al., 2nd USENIX Conference on File and Storage Technologies, Mar. 31-Apr. 2, 2003.

*A Two-Tiered Software Architecture for Automated Tuning of Disk Layouts*, Brandon Salmon, et al. , Apr. 2003, (12 pp.).

*A Low Bandwidth Network File System*, Athicha Muthitacharoen, et al., TR CS-96-08.

Using Content-Derived Names for Caching and Software Distribution, Ethan L. Miller, et al., TR CS-96-08.

Snap-Mirror®: File System Based Asynchronous Mirroring for Disaster Recovery, Hugo Patterson, et al., Proceedings of the FAST 2002 Conference on File and Storage Technologies, Monterey, California, USA, Jan. 28-30, 2002 (14 pp.).

*Matching Application Access Patterns to Storage Device Characteristics*, Jiri Schindler, May 2004, Doctoral Thesis, Dept. of Electrical and Computer Engineering, Carnegie Mellon University, May 2004 CMU-PDL-03-109 (194 pages).

*Maintenance-Free Global Data Storage*, Sean Rhea, et al., IEEE Internet Computing, Sep.-Oct. 2001, (pp. 40-49).

*Collision Search Attacks* on SHAI, Xiaoyun Wang, et al., Feb. 13, 2005.

*The Ubiquitous B-Tree*, Douglas Corner, Computing Surveys, Jun. 1979.

*The Ubiquitous B-Tree*, Marcel Adam.

“Veritas NetBackup PureDisk: Overview—Symantic Corp.”, http://www.symantec.com/enterprise/products/overview.jsp?pcid=1018&pvid=1381_1 Jul. 11, 2007.

Leach, et al., “Standards Track”, RFC 4122, A UUID URN Namespace, (pp. 1-40) Jul. 2005.

* cited by examiner

*Primary Examiner* — Michael Hicks

(74) *Attorney, Agent, or Firm* — Muirhead and Saturnelli, LLC

(57) ABSTRACT

Described are techniques for representing a data segment comprising. A list of one or more tokens representing one or more data portions included in the data segment is received. A unique identifier uniquely identifying said data segment from other data segments is received. A signature value determined in accordance with said list of tokens and said unique identifier is received. The list of tokens, said unique identifier, and said signature value are stored as information corresponding to said data segment.

20 Claims, 16 Drawing Sheets

900
902 Current block = next device block
904 Done? YES Stop
NO
906 Determine hash value for current block.
908 Obtain corresponding saved hash value for current block from list of hash values for backup data set.
910 Hash values match? NO
912 Set corresponding BFD bitmap entry for current block = 1.
YES
914 Set corresponding BFD bitmap entry for current block = 0.

| Block No. | Change? |
|---|---|
| 0 | 0 |
| 1 | 1 |
| 2 | 0 |
| 3 . . . | 0 . . . |

TECHNIQUES USING IDENTIFIERS AND SIGNATURES WITH DATA OPERATIONS

BACKGROUND

1. Technical Field

This application generally relates to data storage systems, and more particularly to techniques used with storing and accessing data on data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and host or servers may be configured in a network arrangement. Operations, such as data backups and restorations, may be performed with respect to data for one or more of the servers. Various technologies may be used in connection with storing and retrieving the backup data such as a single instance storage (SIS) technology which performs data deduplication to eliminate redundant data. SIS technologies manage duplicate copies of content by keeping a single copy of the content and providing a reference or token to the single copy. The reference or token may be used to describe multiple instances of a same copy of backed up data such as may be present, for example, when backing up a same set of data at different points in time.

In connection with SIS technologies and others used in connection with data storage and retrieval, it may be desirable to use techniques for efficiently utilizing resources of a network in connection with the various operations performed such as, for example, when performing backup and restoration operations. It may also be desirable to have such techniques be scaleable and result in a reduction in backup and/or recovery time.

SUMMARY OF THE INVENTION

In accordance with one aspect of the invention is a method of representing a data segment comprising: receiving a list of one or more tokens representing one or more data portions included in the data segment; receiving a unique identifier uniquely identifying said data segment from other data segments; receiving a signature value determined in accordance with said list of tokens and said unique identifier; and storing said list of tokens, said unique identifier, and said signature value as information corresponding to said data segment. Each of said tokens may represent data located at a particular location in said data segment. Each of said tokens may be a hash value determined using the data located at the particular location. Each of said data portions may correspond to a fixed size of one or more data blocks of a storage device. The signature value may be a digital signature having a value, and the method may comprise: performing verification processing of said list of tokens using at least one of said unique identifier and said signature; and using said list of tokens in connection with a data operation for said data segment if said verification processing is successful. The data operation may be at least one of: a data synchronization operation and a restoration operation. The data synchronization operation may include determining a current data state of said data segment by comparing data currently included in said data segment to a previous representation of said data segment from a different point in time. The restoration operation may include performing said data synchronization operation and restoring said data segment to said previous representation. The method may also include: for each of said data portions of said data segment, determining whether a first token having a first value determined using first data currently comprising said each data portion is different from a second token having a second valued determined using second data corresponding to said each data portion of said previous representation. The data segment may be data from a client backed up to a server, said information corresponding to said data segment representing a backup of said data segment of said client at a point in time, and the method may further comprise: sending data included in said data segment from said client to said server; determining, by said client, said list of one or more tokens and sending said list to said server; determining, by said server, said unique identifier; sending said unique identifier to said client; and determining, by said client, said signature. The method may also include: performing a restoration operation for said data segment to said client to restore said data segment to a data state corresponding to said list of tokens, said performing including: performing verification processing of said list of tokens using at least one of said unique identifier and said signature; determining differences between data currently comprising said data segment and other data representing said data state corresponding to said list of tokens; and restoring data portions of said data segment determined to include data that is currently different from other data represented by said list of tokens. The performing verification processing and said determining differences may be performed by said client, and said determining differences may be performed on said client without interaction with said server from which said data is restored in connection with said restoring. The method may also include determining that at least one of said list of one or more tokens and said unique identifier has been compromised if said verification processing fails.

In accordance with another aspect of the invention is a computer readable medium comprising code stored thereon for representing a data segment, the computer readable medium comprising code for: receiving a list of one or more tokens representing one or more data portions included in the data segment; receiving a unique identifier uniquely identifying said data segment from other data segments; receiving a signature value determined in accordance with said list of tokens and said unique identifier; and storing said list of tokens, said unique identifier, and said signature value as information corresponding to said data segment. Each of the tokens may represent data located at a particular location in said data segment, each of said tokens is a hash value determined using the data located at the particular location, and each of said data portions may correspond to a fixed size of one or more data blocks of a storage device. The signature value may be a digital signature having a value, and the computer readable medium may further comprise code for: performing verification processing of said list of tokens using at least one of said unique identifier and said signature; and using said list of tokens in connection with a data operation for said data segment if said verification processing is successful, wherein said data operation is at least one of: a data synchronization operation and a restoration operation. The data synchronization operation may include determining a current data state of said data segment by comparing data currently included in said data segment to a previous representation of said data segment from a different point in time. The restoration operation may include performing said data synchronization operation and restoring said data segment to said previous representation. The computer readable medium may further comprise code which, for each of said data portions of said data segment, determines whether a first token having a first value determined using first data currently comprising said each data portion is different from a second token having a second valued determined using second data corresponding to said each data portion of said previous representation. The data segment may be data from a client backed up to a server, said information corresponding to said data segment representing a backup of said data segment of said client at a point in time. The computer readable medium may further comprise code for: sending data included in said data segment from said client to said server; determining, by said client, said list of one or more tokens and sending said list to said server; determining, by said server, said unique identifier; sending said unique identifier to said client; determining, by said client, said signature; and performing a restoration operation for said data segment to said client to restore said data segment to a data state corresponding to said list of tokens. The step of said performing a restoration operation may also include: performing verification processing of said list of tokens using at least one of said unique identifier and said signature; determining differences between data currently comprising said data segment and other data representing said data state corresponding to said list of tokens; and restoring data portions of said data segment determined to include data that is currently different from other data represented by said list of tokens.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
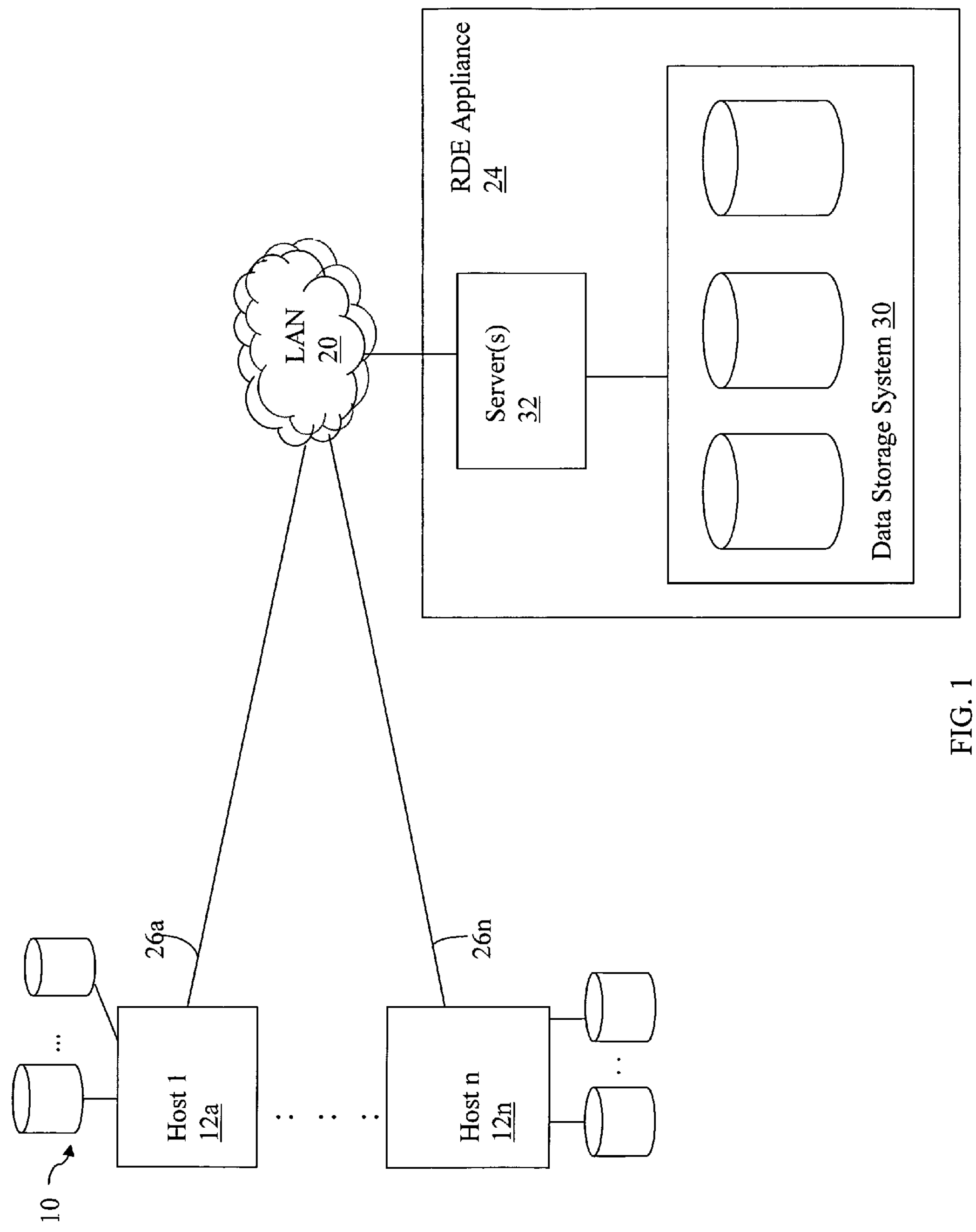
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more hosts or servers 12*a*-12*n*. The hosts or servers 12*a*-12*n* may perform operations, such as backup and/or restoration of data from one or more of devise of each of the hosts 12*a*-12*n*. The hosts 12*a*-12*n* may communicate using respective communication connections 26*a*-26*n* with a LAN 20. A host 12*a*-12*n* may perform a backup operation of host data by sending the backup data using the LAN 20 to the RDE (redundant data elimination) appliance 24. In one embodiment, the connections 26*a*-26*n* may be Ethernet connections.

In connection with performing a backup operation of the host data, the host communicates with one or more servers 32 of the RDE appliance 24, for example, over a network connection. In one embodiment, the RDE appliance 24 may be characterized as including components which perform data deduplication to eliminate redundant data. The RDE appliance 24 may utilize single instance store (SIS) technologies to perform the foregoing when storing a received data set. As known in the art, SIS technologies manage duplicate copies of content by keeping a single copy of the content and providing a reference or token to the single copy. The reference or token may be used to describe multiple instances of a same copy of backed up data as described in more detail elsewhere herein. The RDE appliance 24 includes components that perform data reduction for the storage subsystem along with efficient data transmission techniques in the example system of FIG. 1.

The RDE appliance 24 may include hardware and/or software used in connection with servicing backup and/or restore requests such as those that may be received from the hosts 12*a*-12*n*. The RDE appliance 24 may include one or more processors or servers 32 for use in connection with performing servicing the requests.

The one or more data storage systems 30 may be used for storing the backed up data processed in accordance with the techniques described herein in connection with redundant data elimination as performed by the RDE appliance 24. In one embodiment, the data storage system 30 of the RDE appliance 24 may contain the unique instances of content data and the related indexing and access structures. Each of the data storage systems of element 30 may include one or more data storage devices, such as disks. One or more data storage systems may be manufactured by one or more different vendors. Each of the data storage systems included in 30 may be inter-connected (not shown). Each of the data storage systems of element 30 may include a plurality of disk devices or volumes. The particular data storage systems and examples as described herein for purposes of illustration should not be construed as a limitation.

The disk drives of the data storage system 30 may be accessed using a logical partitioning of the physical devices into logical volumes (LVs) or logical units. The logical units may or may not correspond to the actual disk drives. For example, one or more logical units may reside on a single physical disk drive. An LV or LUN (logical unit number) may be used to refer to one of the foregoing logically defined devices or volumes.

Although specific examples and types of communication connections may be described herein, the communication connections used in an embodiment may be any one or more of a variety of networks or other type of communication connections as known to those skilled in the art. For example, the connections may be a network connection, bus, and/or other type of data link, such as a hardwire or other connections known in the art. The components of the example 10 may communicate, for example, over the Internet, an intranet, network or other wireless or other hardwired connection(s). Some or all of the connections by which the components of the example 10 use for communication may pass through other communication devices, such as a Connectrix, Fibre Channel, or other switching equipment that may exist such as a phone line, a repeater, a multiplexer or even a satellite.

The processors included in the host computer systems 12*a*-12*n*, the RDE appliance 24 and other components in the system 10 may be any one of a variety of proprietary or commercially available single or multi-processor system, such as an Intel-based processor, or other type of commercially available processor able to support traffic in accordance with each particular embodiment and application.

It should also be noted that each of the components included in the example 10 of FIG. 1 may all be located at the same physical site, or, alternatively, may also be located in different physical locations. The particular communication connections used may also vary in accordance with the location of the components in a system.

Different techniques that may be utilized in one embodiment of the RDE appliance 24 are described, for example, in U.S. patent application Ser. No. 11/479,864, filed Jun. 30, 2006, entitled AFFINITY CACHING, (the '864 application) which is incorporated by reference herein.

In connection with the techniques that may be used with the RDE appliance 24, a data element, such as a file, an entire logical or physical device, or other data entity, may be partitioned into one or more atomic units. Each such unit may be the same size. A hash value may be computed for each atomic unit of a data set. The hash values may be used in detecting differences or changes between data sets as described in more detail in following paragraphs. The particular block size selected may vary with embodiment. It should be noted that although the techniques described herein utilize hash values, other tokens may be used to uniquely represent a portion of data, such as a data block. Other such tokens may vary with embodiment. Examples are described, for example in the '864 application.

In connection with the techniques herein, an embodiment may use a fixed length block size as the atomic unit for detecting changes as may be used in a system. The block size may be, for example, 4 KB, 8 KB, or 16 KB. In such systems, the fixed block size facilitates a sufficient level of compression of the original data sets while also providing a scaleable approach in accordance with storage and CPU resources. The particular fixed block size selected may vary with embodiment and may be determined using, for example, empirical testing or sampling of expected input data streams. An embodiment utilizing the techniques described herein may have a fixed length block size as the unit for partitioning data such as, for example 4 KB, or select from one or more block sizes occurring on defined boundaries such as, for example, 4 KB, 8 KB, or 16 KB. The techniques described herein may also be used in connection with block sizes of other lengths, for example, not occurring on a 4 KB boundary as described above. However, in such embodiments, additional overhead may be incurred in connection with implementation of the techniques herein.

Figure 2:
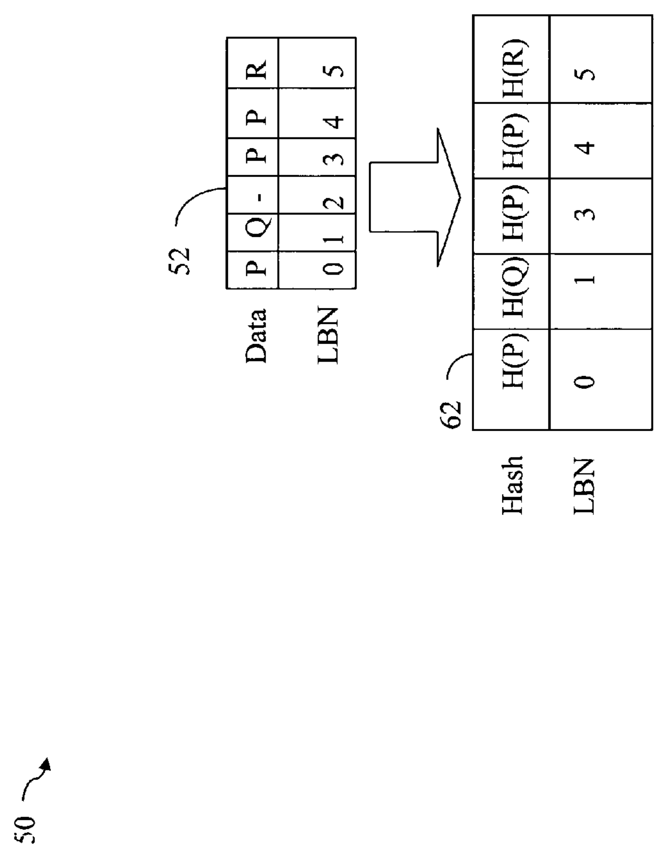
FIG. 2 is an example representation of data files using hash values.

Referring now to FIG. 2, shown is an example representation illustrating a representation of data that may be used in connection with the techniques described herein. The example 50 includes a data segment 52 which may represent, for example, data on a device. In connection with processing techniques of the RDE appliance, for example, as described in the '864 patent application, the data segment 52, which may be received by the RDE appliance in connection with a backup of host data, may be partitioned into various partitions or portions of data as represented by the letters P, Q and R. The data segment 52 may be, for example, data from one or more files, a specified segment of data from a device, data included on an entire device, and the like. For purposes of illustration, a portion of data which is duplicated in one or more locations in 52 includes the same letter. For example, the data segment 52 includes three data portions which are the same as denoted by the letter P.

In connection with the techniques described herein, a token, signature, or reference uniquely representing each of the data portions is obtained. In one embodiment, the token or reference is a hash value obtained using a hashing function, such as a cryptographic hashing function. Examples that may be used in an embodiment include, for example, the MD-5 and SHA-1 hashing algorithms. The size of the hash value used in connection with the techniques described herein may vary with embodiment. In one embodiment, a hash value which is 20 bytes in length may be used.

A data segment 52 may be represented or virtualized using the one or more hashes corresponding to the portions of the segment 52. In connection with the techniques described herein in one embodiment, a data segment 52 of host data may be partitioned into fixed portions as illustrated in FIG. 2. In the example 50, the size of each portion may be 4 KB or the size of one logical block. Each logical device, such as a LUN, may include multiple blocks and a location on the LUN may be represented by a logical block number (LBN) corresponding to an offset value which is multiple of the block size for the LUN (e.g, offset=LBN*block size). In this example, the data segment 52 includes 6 LBNs numbered 0 . . . 5, inclusively. A hash value for each of the data portions, such as each of LBN's of 52, may be determined as represented by 62. It should be noted that at LBN 2, there is no data stored and in the representation 62, such unused data portions may be omitted. The representation 62 includes a map of each LBN of data (e.g., P, Q, R) and its corresponding hash value (e.g., denoted H(P), H(Q), and H(R), respectively). The representation 62 is one form of virtualization of the data segment 52.

When a program, such as a backup application of a host 12*a*, stores data using data deduplication techniques, a corresponding list of one or more hash values, such as illustrated by 62, may be generated to represent the data. In one embodiment as described elsewhere herein, the list of hash values may be generated by the backup application on the host and returned to the RDE appliance with the data set to be backed up. The RDE appliance 24 stores a single instance of each unique data portion, such as each LBN. For example, the RDE appliance 24 stores 3 unique data portions or partitions P, Q and R for the data segment 52.

It should be noted that other values may be used to uniquely identify each data portion other than a hash value in an embodiment.

When a program stores data at the RDE appliance 24, a virtualized representation of the data segment 52, such as illustrated by 62, may be generated by the host and returned to the RDE appliance with the data as described above. The virtualized representation may be used in connection with subsequent data operations, such as backup and/or restore operations that may be performed by the host as described in more detail in connection with techniques described herein. When presented with the virtualized representation of the data segment, or portion thereof, the RDE appliance 24 may fetch the actual content or data and return the data, such as data segment 52. The foregoing may be performed, for example, in connection with restoring all or part of the data on a device of a host. Additionally, the virtualized representation may also be used in connection with performing subsequent backups of the data set.

In connection with techniques described herein, a virtualized representation of data segments, such as including one or more files, may be used to determine differences between data segments.

Figure 3:
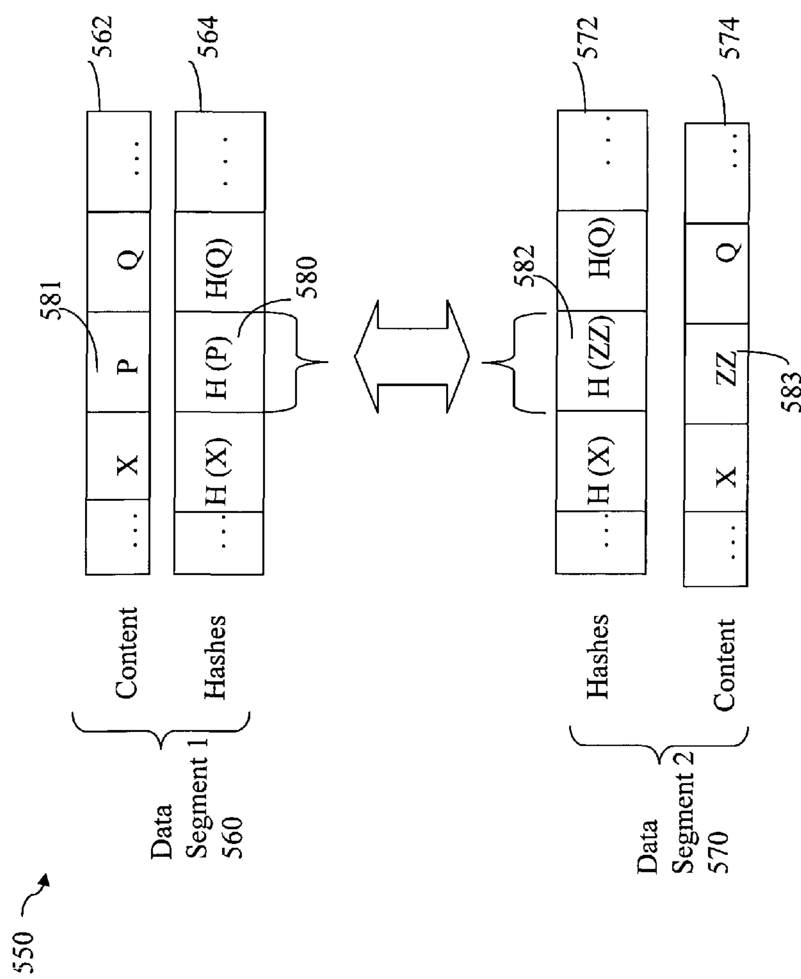
FIG. 3 is an example representation of a data structure used in connection with representing a point in time copy of data on a device.

Referring now to FIG. 3, shown is an example illustrating a virtualized representation and comparison of two data segments. A first data segment 560 may have content 562 and may be represented using the virtualized representation 564. A second data segment 570 may have content 574 and may be represented using the virtualized representation 572. The virtualized representations 564 and 572 may be generated, for example, by the host in connection with techniques described herein for storing data segments 560 and 570. In connection with techniques described herein, the virtual representations 564 and 572 may be compared to determine which portions of the two data segments 560 and 570 are different. With reference to FIG. 3, the portions 580 of data segment 560 and 582 of data segment 570 differ. Data segment 560 may be a first backup data set at a first point in time, and data segment 570 may be a different backup of the same data set, such as from the same device of a same host, at a subsequent point in time. For example, a first backup operation may be performed of host data from a device represented as data segment 560. At a later point in time, a second backup operation of host data from the same device, represented as data segment 570, may be performed. Using the techniques described herein when performing the second backup, only changed portions of the data segment need to be sent to the RDE appliance 24. Such changed portions may be determined utilizing the virtualized representations of the data sets. This is described in more detail in following paragraphs.

It should be noted that the example illustration of FIG. 3 is performed with respect to each block of data. In connection with techniques described herein in one embodiment, changes at the block level are detected and then data operations, such as backup operations, may be performed with respect to files including these changed blocks as described in more detail elsewhere herein.

What will now be described are techniques that may be used in connection with components on a host or server, such as each of 12*a*-12*n* of FIG. 1.

Figure 4:
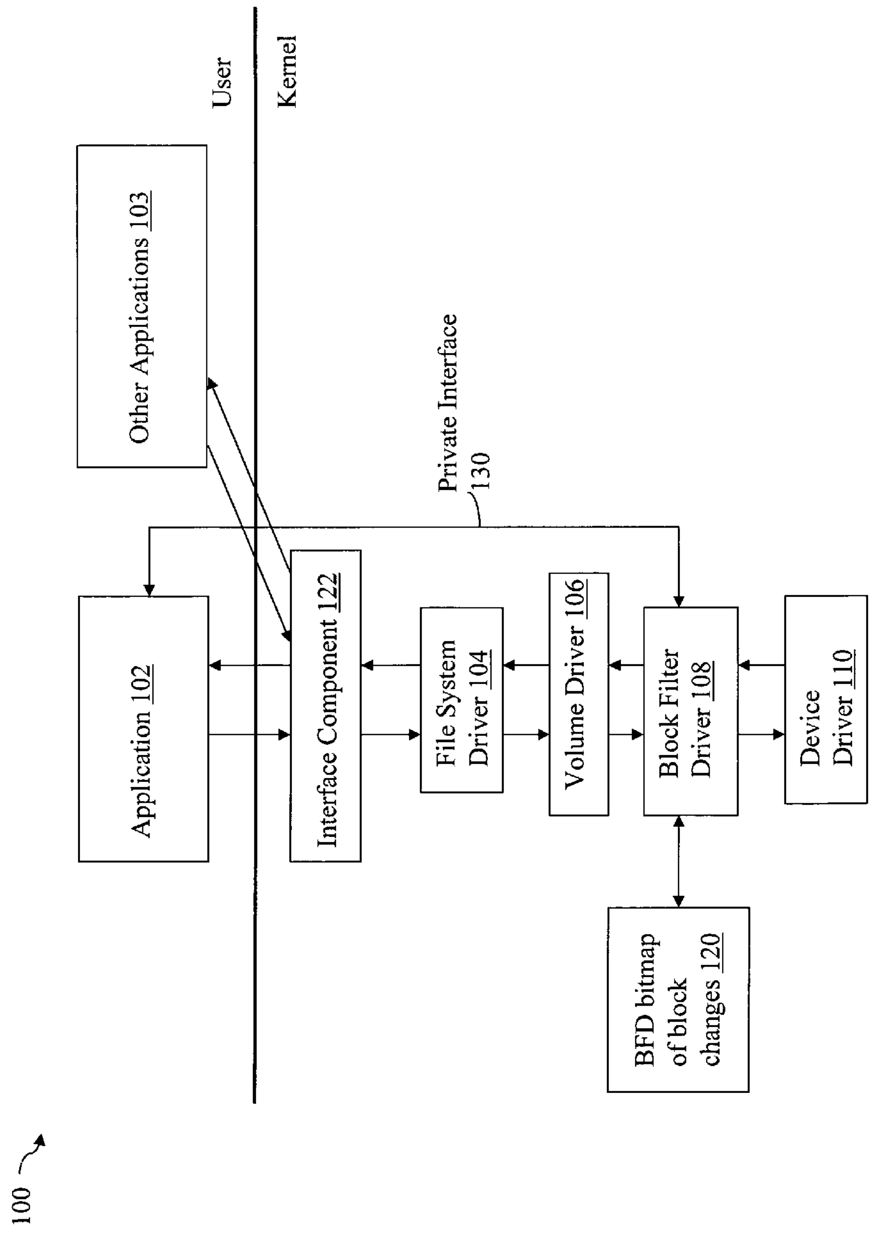
FIG. 4 is an example of an embodiment of components that may be included in a host or server of the system of FIG. 1.

Referring now to FIG. 4, shown is an example representation of components that may be included in an embodiment of a host such as host 12*a* of FIG. 1. It should be noted that this example 100 is illustrated with respect to a single host, such as 12*a*, but each host in the system 10 of FIG. 1 may include similar components for use in connection with the techniques described herein.

The example 100 includes an application 102 and other applications 103 executing in user space and other components executing in kernel space. As known in the art, various operating systems may include different levels or modes of execution, such as associated with kernel and user mode/space. Other embodiments utilizing the techniques herein may include different designations than "user" and "kernel" as described herein that may vary with embodiment.

Executing in kernel space in the example 100 are an interface component 122 and multiple drivers including a file system driver 104, a volume driver 106, a block filter driver (BFD) 108 and a device driver 110. An embodiment may use other drivers than as illustrated herein which form an execution call stack or chain as illustrated during operation of the application 102. In one embodiment, the application 102 may be a backup application which backs up data from the host to the RDE appliance 24. In connection with performing the backup operation, the application 102 may interact with the interface component 122 and drivers as illustrated in the example 100. The application 102 may be a restoration application which restores data from the RDE appliance 24 to one or more devices of the host. In connection with performing the restoration operation, the restoration application may also interact with components of the host as illustrated in 100.

In one embodiment, the calling chain of components 122, 104, 106, 108, 110 illustrated in the example 100 may be used in connection with all applications on the host, for example, to perform data operations. Additionally, specific applications, such as backup and restoration applications and others used in connection with the RDE appliance, may be able to more directly access the BFD bitmap, for example, using a different interface, such as the illustrated private interface 130. An embodiment may include the interface 130 to facilitate communications between an application 102, such as one used in connection with the RDE appliance, and the BFD 108. In turn, the interface 130 may used to perform operations in connection with the BFD bitmap 120 such as, for example, a request for data changes since a previous backup.

Other applications 103 may also interact with the interface component 122 and the drivers illustrated in the example 100 when performing file operations, such as reading and/or writing to files on a device of the host. When performing such file operations, the BFD 108 may detect and record block level changes made to host data. Such changes may be recorded in the BFD bitmap of block changes 120. The structure 120 is illustrated and described in more detail elsewhere herein.

For example, one of the other applications 103 may be a word processing application that writes data to a file on the host. The word processing application may make a call to the component 122 and utilize drivers 104, 106, 108 and 110 when performing the write operation. The BFD 108 records the changes to the data in the file at the block level in the structure 120. As known in the art, a file may include data stored in one or more blocks of a device. The word processing application performs the write operation in terms of accesses to a file including one or more blocks. The blocks affected by the write operation are known to the BFD 108 and recorded in the structure 120. The mapping of blocks to a file, and vice versa, may be performed by a driver in the call stack, such as the file system driver 104. For example, the word processing application may perform a write to a location in the file. A driver may determine the one or more blocks associated with the file and the block including the location affected by the write operation. The BFD records which block is modified by the write operation.

The first time a backup of the device is performed, all the data on a device may be transmitted to the RDE appliance 24 and the BFD bitmap 120 may then be initialized. After the first backup, applications, such as the word processing application, may modify data on the device. Such data modifications may be recorded by the BFD 108 in the structure 120 as the write operations are performed. At a later point in time, the backup application may perform a second backup of the device. Using techniques described herein, the structure 120 may be used to reduce the amount of data which is transmitted to the RDE appliance 24 in connection with the second backup of the device. In one embodiment, the backup application may determine which portions of data on the device have changed since the first backup, and transmit data to the RDE appliance 24 in connection with only those changed portions.

It should be noted that the backup application may perform backups at the block level in accordance with the changes recorded by BFD 108 in the structure 120. When performing a backup, the backup application may query the interface component 122 for changed or modified blocks since the previous backup based on the block level changes recorded in 120. The backup application may obtain such changed data blocks using the interface component 122, and then may backup those changed portions. The component 122 may obtain the changed blocks since the previous backup using the lower level drivers in the example 100 and/or other components. For example, the BFD 108 may report the block level changes recorded in 120 to one or more higher level components as illustrated in the execution call stack. A higher level component may then obtain the changed blocks and communicate the foregoing to the backup application through the interface component 122 as return information for the previous query. The foregoing may inform the backup application to backup one or more modified blocks as indicated by the structure 120. The data blocks may then be forwarded by the backup application for backup on the RDE appliance. As also described herein, rather than interface with the component 122 when determining changed or modified blocks since the previous backup based on block level changes, an embodiment may provide a private interface 130. The backup application may use the private interface 130 to query the BFD 108 regarding the changed blocks and to obtain the necessary changed blocks data.

Figure 5:
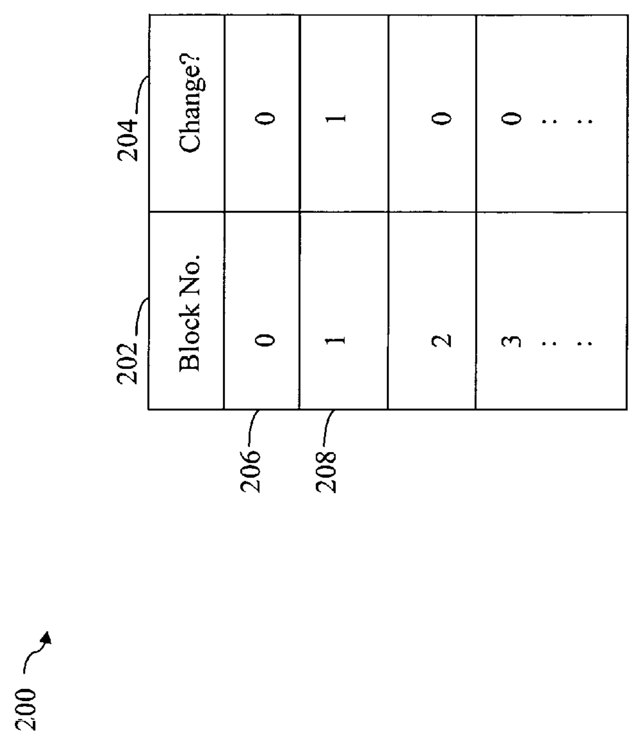
FIG. 5 is an example of an embodiment of a block filter driver (BFD) bitmap.

Referring now to FIG. 5, shown is an example of an embodiment of the BFD bitmap structure 120 of FIG. 4. In the example 200, the BFD bitmap or bit vector includes a bit indicator setting in column 204 for each block on the device of the host having a corresponding block number as indicated in 202. In this example 200, a value of 0 in column 204 indicates that the corresponding block has not been modified since the previous backup and a value of 1 indicates otherwise that there has been a modification to the corresponding block. For example, the status of block 0 is denoted by element 206 which indicates that block 0 has not been modified since the previous backup. The status of block 1 is denoted by element 208 which indicates that block 1 has been modified since the previous backup. It should be noted that values in column 202 may denote index values of the structure 120 rather than an actual data field. The BFD 108 may include a bitmap as illustrated in 200 for each host device utilizing the techniques described herein.

After completing a backup of a device, entries of the BFD bitmap corresponding to the device may be initialized by the backup application to include a value of 0 in the bitmap location for each block of the device. As changes are made to blocks of the device subsequent to the backup, appropriate entries of the device's BFD bitmap are set to 1 in accordance with the changes. As such, a determination of which blocks have been modified since the backup can be made by examining the BFD bitmap for entries having a value of 1 as indicated in column 204.

In one embodiment, the BFD bitmap structure 120 may be stored in memory and also persistently stored by the host. There may be a BFD bitmap structure 120 for each host device.

When performing a backup operation, an embodiment may use any one of a variety of different techniques in connection with the BFD bitmap in order to handle any data modifications occurring while the backup operation is in progress. In one embodiment, a snapshot or copy of the BFD bitmap may be made. The BFD bitmap may then be reinitialized (e.g., all entries=0). Any writes or modifications occurring while the backup operation is in progress are recorded in the reinitialized BFD bitmap. The backup operation is performed using the snapshot or copy of the BFD bitmap prior to reinitialization.

Processing associated with data portions which are modified while the backup operation is in progress may be handled in a variety of different ways. In one embodiment, an on-demand technique may be used. In connection with the on-demand technique, if the data portion which is being modified has not yet been backed up, the data portion is backed up prior to being modified. The backup of the data portion may be performed out of order prior to other data portions which are not being modified (e.g., copy or backup on first write). Another technique that may be used in an embodiment includes storing both the original and modified version of the data portion.

In the event the backup operation fails to complete, the bitmap is restored to a state to incorporate the snapshot or copy and also reflect any additional modifications that may have occurred during the backup operation that failed. In such instances, the bitmap may be restored by logically ORing the snapshot bitmap with the reinitialized bitmap that has been updated to reflect any modifications.

Figure 6:
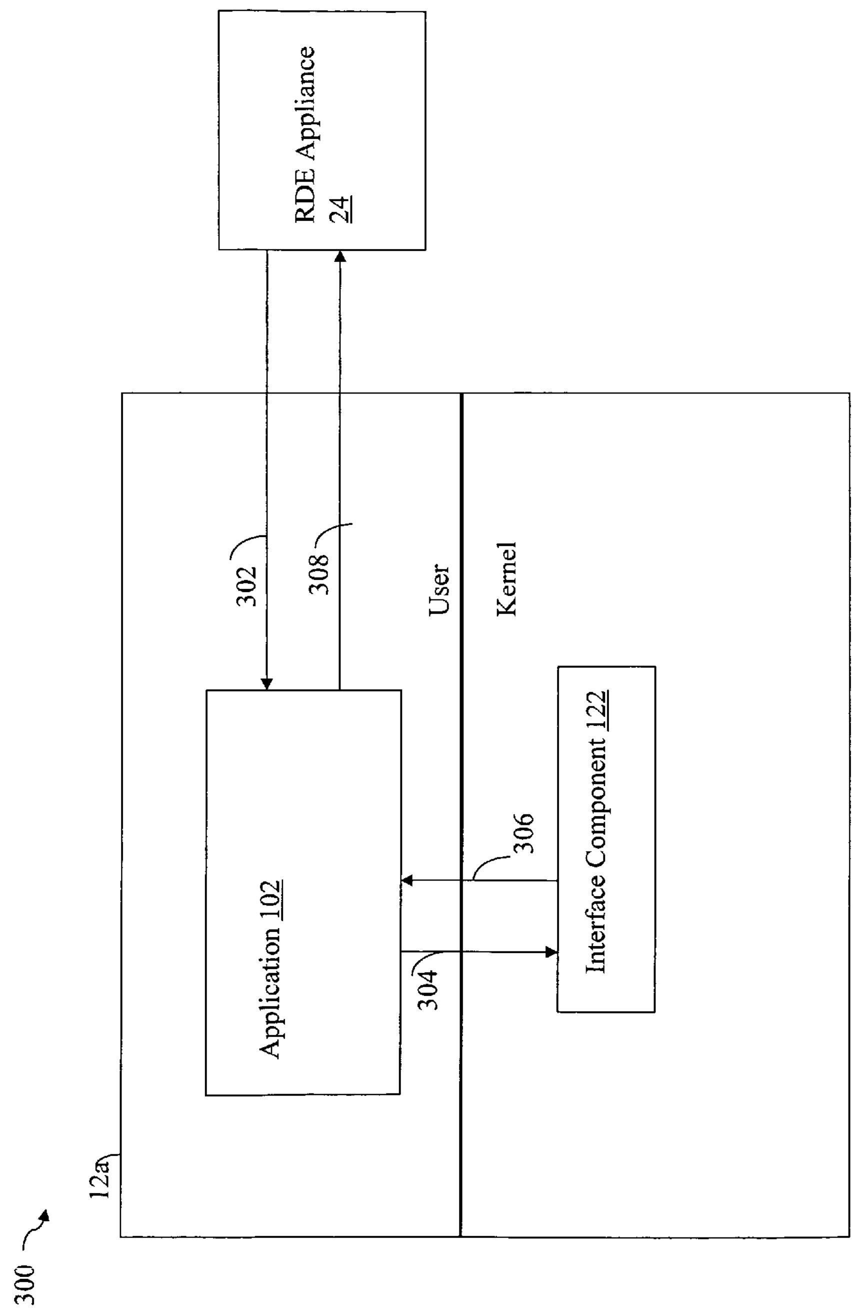
FIG. 6 is an example illustrating the data flow in connection with performing a backup operation.

Referring now to FIG. 6, shown is an example illustrating the data flow between a host and the RDE appliance 24 in connection with performing a backup of host data to the appliance 24. In the example 300, the RDE appliance 24 may request the backup data from the application 102 as illustrated by 302. As described in the '864 application, the RDE appliance 24 may drive the data backup process in accordance with a schedule. Although the '864 application describes the RDE appliance with respect to tape devices, the techniques may also be used in connection with other devices and the backup of data sets of one or more hosts may be performed in accordance with other criteria besides that related to tape devices. In this example, the application 102 may be a backup application. The application 102 may request the data changes to be backed up as indicated by 304. Using the techniques described herein, the backup application may request the data changes by issuing such a request to the component 122. The component 122 may obtain such data changes from other lower level components, for example, as illustrated in connection with other figures herein. It should be noted that the other components have been omitted from FIG. 6 for simplicity of illustrating the interactions between the host and the RDE appliance 24. As described elsewhere herein, the component 122 may request the block level data changes from lower level components. The block level changes as tracked using the structure 120 may be communicated to the backup application as illustrated by 306. The application 102 may determine the list of hash values for the backup data set. The application 102 may then transmit the data to be backed up to the RDE appliance 24 and the list of hash values for the backup data set as illustrated by 308.

As also described herein, when obtaining the block level changes to be backed up, the backup application may obtain the data changes by issuing a request using private interface 130 of FIG. 4 rather than using the interface component 122.

It should be noted that in connection with performing a backup operation, one or more requests for backup data may be received from the RDE appliance 24. In ether words, the RDE appliance 24 may request data associated with a single backup by issuing multiple requests. Each such request may be for a portion of the backup data.

As an example, a full or complete backup of a device on the host 12*a* may be performed on a Sunday. Using the techniques described herein, all the data on the device may be sent to the RDE appliance 24 for the backup. During the week, incremental backups may be performed with respect to the complete backup on Sunday. Such incremental backups may be scheduled and the RDE appliance 24 may request the incremental changes, for example, on Monday, Tuesday, and the like. The backup application obtains the data associated with the incremental changes and communicates the data changes to the RDE appliance 24 as recorded by the BFD 108 in the BFD bitmap 120 for the device.

In connection with techniques described herein in one embodiment, once a backup operation is complete, a list of hash values corresponding to the data blocks of the backup data set may be determined by the host and stored for the corresponding data set. The host may return the list of hash values for the backup data set to the RDE appliance in addition to the changed data portions. As described elsewhere herein, the RDE appliance may utilize data deduplication techniques such as those of a SIS technology. The host may determine the hash value for each changed data portion as the data is sent to the RDE appliance. After all the data has been sent to the RDE appliance, the host may determine a list of hash values corresponding to the backup data set and return the list of hash values to the RDE appliance. In one embodiment, the backup application may perform processing for both a complete backup and an incremental backup. In both instances, the host may return a list of hash values for the entire backup data set to the RDE appliance. Additionally, a globally unique identifier (GUID) may be determined for the particular backup data set. The GUID may be characterized as uniquely identifying the particular backup data set from other backup data sets that may be included in an embodiment. Any one of a variety of different techniques may be used in connection with determining such GUIDs to uniquely identify a backup data set. For example, one technique for determining GUIDs is described in RFC 4122, entitled "Universally Unique IDentifier (UUID) URN Namespace". An embodiment may use other techniques in determining GUIDs.

In accordance with one aspect of a GUID, the GUID may be characterized as a backup data set identifier. In one embodiment, the GUID may be determined by the RDE appliance 24 and sent to the backup application on the host after the backup has completed and the host receiving a list of hash values for the backup data set. Upon receiving the GUID, the host may acknowledge receipt of the GUID to the RDE appliance. Alternatively, an embodiment may have the backup application on the host determine the GUID and send the GUID to the RDE appliance. Upon receipt of the GUID, the RDE appliance may acknowledge receipt of the GUID to the host. In either of the foregoing, both the host and RDE appliance have the same GUID and agree upon the GUID functioning as an identifier for the associated backup data set. Additionally, in an embodiment, the host may digitally sign the GUID and associated list of hash values for each backup data set. Any one of a variety of different techniques may also be used in connection with determining a digital signature for the combination of the GUID and the list of hash values. The host may communicate this signature to the RDE appliance and the RDE appliance may acknowledge receipt of the signature.

The backup application on the host may persistently store the list of hash values, GUID and digital signature for a backup data set. In one embodiment, the host may store such information persistently for one or more backup data sets including the most recent backup data set for each host device. The host may store the list of hash values, GUID and digital signature in memory and then subsequently store the foregoing to persistent storage. Once the information including list of hash values, GUID, and digital signature are persistently stored and the RDE appliance acknowledges receiving the same information, the host may delete its copy of the information from memory on the host. It should be noted that an embodiment may choose to store, persistently and/or in memory, a list of hash values, GUID and digital signature for multiple backup data sets. For example, an embodiment may store such information for a specified number of most recent backup data sets, selected full and/or incremental backup data sets, and the like. The foregoing techniques may be used to identify a known backup data set or state of a host data device as agreed upon by the host and the RDE appliance. The list of hash values, GUID and digital signature for a backup data set may be used in connection with a subsequent data restoration operation as described elsewhere herein in more detail.

It should be noted that an embodiment may use any one of a variety of techniques in connection with producing a list of hash values corresponding to a backup data set. For example, processing may be performed by the backup application on the host in connection with constructing a complete list of hash values for the latest backup data set using a list of hash values associated with a previous backup data set. For a new backup data set, the host may revise the existing list of hash values of a previous backup data set by replacing those hash values for changed or modified data blocks.

Figure 7:
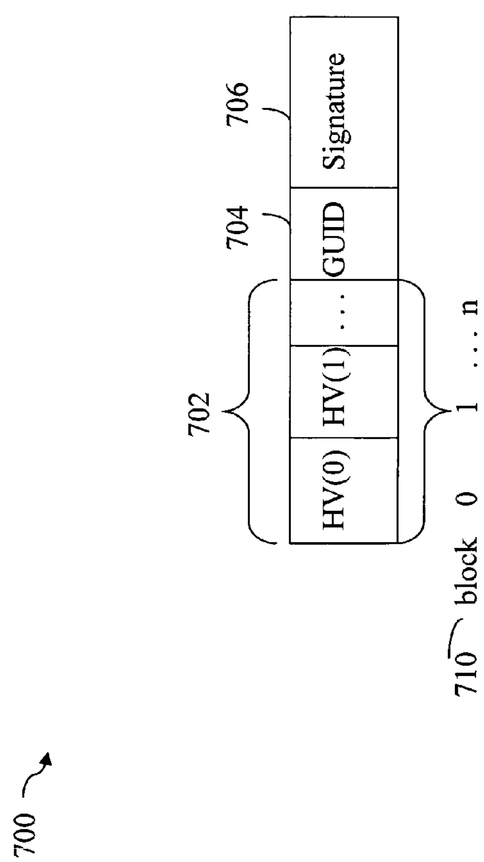
FIG. 7 is an example representation of information including metadata that may be stored for each backup data set.

Referring now to FIG. 7, shown is an example illustrating information that may be used in connection with the techniques described herein for a backup data set. The example 700 includes the information as may be stored on the host and RDE appliance for each backup data set described above. The example 700 includes the list of hash values 702 for a given set of data blocks denoted by element 710. It should be noted that the backup data set needs to also record which hash value corresponds to a particular LBN as illustrated by 710.

In this example, there is a hash value for each data block of the backup data set and the data set may be all the data on a host device. The list of hash values may also be characterized as a form of metadata for the corresponding device data. A GUID 704 is associated with the list of hash values 702. The list of hash values 702 and GUID 704 may be digitally signed by the host. A digital signature 706 is associated with the list of hash values 702 and GUID 704 for the backup data set.

Figure 8:
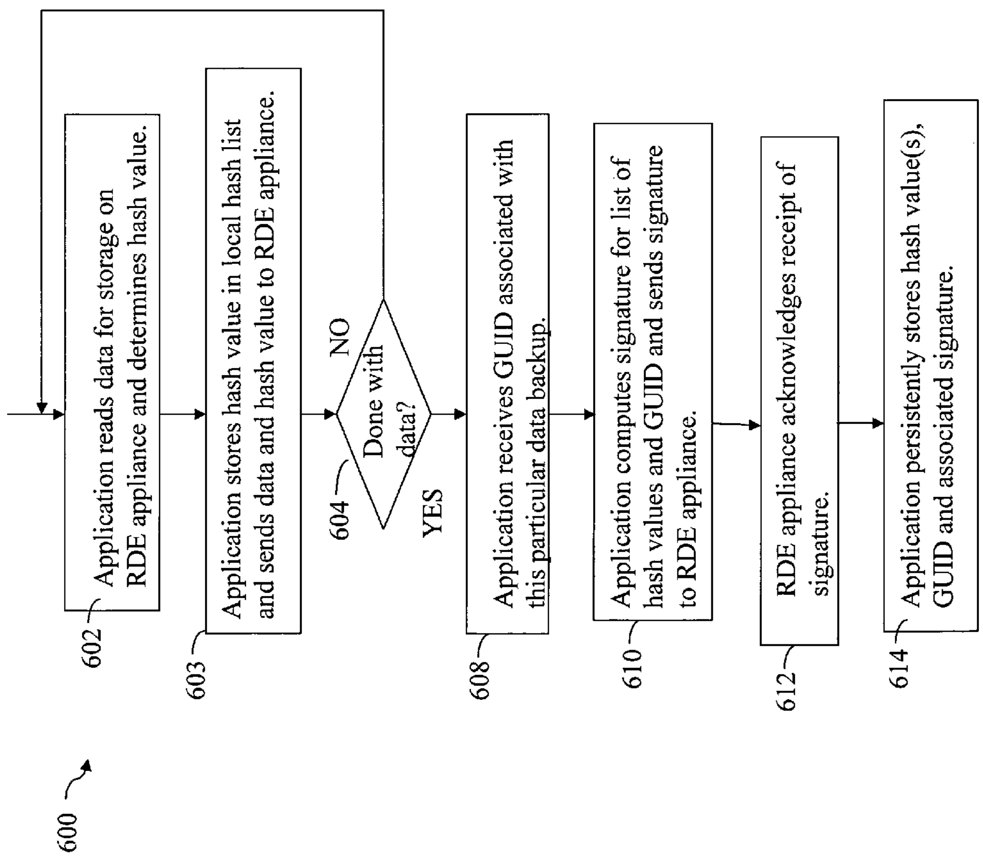
FIG. 8 is a flowchart of processing steps that may be performed in an embodiment in connection with performing a backup operation.

Referring now to FIG. 8, shown is a flowchart of processing steps that may be performed in an embodiment in connection with the techniques described herein when performing a backup operation. The steps of flowchart 600 may be performed, for example, by a host such as host 12*a* of FIG. 1 using the techniques described herein. At step 602, an application, such as a backup application executing on host 12*a*, reads data for storage on the RDE appliance and also determines the hash value corresponding to the data portion read. At step 603, the application then stores the hash value determined in step 602 in the local hash list maintained on the host. The host then sends the data and the associated hash value to the RDE appliance for storage. The data sent may be data included in a backup data set. The data used in steps 602 and 603 may be included in a complete or full backup data set as well as a partial or incremental backup data set. At step 604, a determination is made as to whether all data of the backup data set has been sent to the RDE appliance from the host. If step 604 evaluates to no, control proceeds to step 602. If step 604 evaluates to yes, control proceeds to step 608. It should be noted that the processing of steps 602, 603, and 604 cause a portion of a backup data set to be sent to the RDE appliance in each execution of step 603. As described elsewhere herein, a single set of backup data may be transmitted to the RDE appliance in multiple portions (e.g., step 603 executing multiple times). Once the data has been transmitted to the RDE appliance, step 604 evaluates to yes and control proceeds to 608. It should be noted that the data sent to the RDE appliance by the host in connection with a backup data set (e.g., step 602 processing) may be determined using the BFD bitmap structure as described herein so that only changed data portions with respect to the previous backup are sent to the RDE appliance. In one embodiment, the host may maintain a complete list of hash values for one or more backup data sets. Each such list of hash values may be associated with a GUID and signature as described in connection with subsequent processing steps. The RDE appliance may maintain a list of hash values for a backup data set of only those data portions which have changed. The RDE appliance is capable of reconstructing the complete list of hash values as maintained on the host using hash values of previous backup data sets. In such an embodiment, as just described, the hash values determined and sent to the RDE appliance in step 608 include just the hash values of the changed portions rather than for the entire backup data set.

For example, with reference back to FIG. 3, a first backup of a device at a first point in time may correspond to element 560. A complete backup may be performed with respect to the data segment 560. The host transmits the content 562 to the RDE appliance. The host determines and returns to the RDE appliance the list of hash values 564. A write operation is performed to a single data block so that the content of block 581 is modified from P to ZZ as indicated by 583. As will be appreciated by those skilled in the art, when transmitting the modified data at a particular block, the block location or offset with respect to the device is indicated. The data modification for the write operation is detected and recorded in the BFD bitmap structure 120. A second backup of the device is performed using the BFD bitmap and only the changed data portion ZZ 583 at the particular block is transmitted to the RDE appliance. The host may also determine a hash value corresponding to the changed data portion ZZ. The host may then send the changed data portion ZZ and associated hash value to the RDE appliance. In connection with techniques described herein in one embodiment, each host may calculate a hash value for each data portion and also determine the collective list of hash values corresponding to a backup data set. The collective list for the backup data set may include hash values for the changed portions and those unchanged data portions. The collective list may be maintained on the host. The RDE appliance may store only the one or more hash values of the changed data portions for a given backup data set.

In step 608, the application on the host receives the GUID as determined by the RDE appliance. The GUID is associated with particular backup data set sent to the RDE appliance during execution of step 602. As part of step 608 processing, the host may acknowledge receipt of the GUID to the RDE appliance. As also described herein, an embodiment may have the application executing on the host determine the GUID rather than the RDE appliance. At step 610, once the host and RDE appliance have the same set of hash values and associated GUID, the application computes a digital signature for the list of hash values and the GUID and communicates the signature to the RDE appliance. At step 612, the RDE appliance acknowledges receipt of the signature value. At step 614, the application executing on the host persistently stores the information for the current backup data set for which processing is being performed. In accordance with the techniques herein, the information associated with the backup data set includes the list of hash values, GUID and corresponding digital signature. The RDE appliance may store the GUID and digital signature with the one or more hash values for those changed data portions for a given backup data set.

In connection with the BFD bitmap, the host may determine a problem with an existing version of the BFD bitmap. A problem may occur for any one of a variety of reasons. In one embodiment, when a proper shutdown of a system such as illustrated in FIG. 1 has occurred, a status value may be stored to reflect the proper shutdown. If the system shuts down for another reason, such as when a problem has been detected, then a different status value may also be stored to reflect the problematic reason for the shutdown. The status value may be persistently stored. When the system is subsequently restarted, any previously stored status value may be examined. If there is no status value, or if the status value indicates anything other than a previous proper shutdown, the host may not utilize the persistently stored copy of the BFD bitmap. In other words, if there was not a proper shutdown, there may be problem with the BFD bitmap. As another example of a problem with the BFD bitmap, the host may detect a corruption of the persistently stored, and any in memory copy, of the BFD bitmap.

In such instances where the current state of the BFD bitmap cannot be trusted or the BFD bitmap cannot otherwise be utilized, techniques may be used in connection with rebuilding the BFD bitmap. This may be performed locally on a host, such as by a backup and/or restoration application, using techniques that will be described in following paragraphs. In one embodiment, the BFD bitmap may be reconstructed with respect to the most recent backup data set using the list of hash values, GUID and signature associated with the most recent backup data set. As such, the host can recover locally from the corruption to restore the BFD bitmap to a state allowing the host to continue tracking changed blocks with respect to the latest or most recent backup data set. Such an embodiment may use the rebuilt BFD bitmap, for example, in connection with performing subsequent incremental backups as described herein so that only changed portions of a device are transmitted to the RDE appliance.

Figure 9:
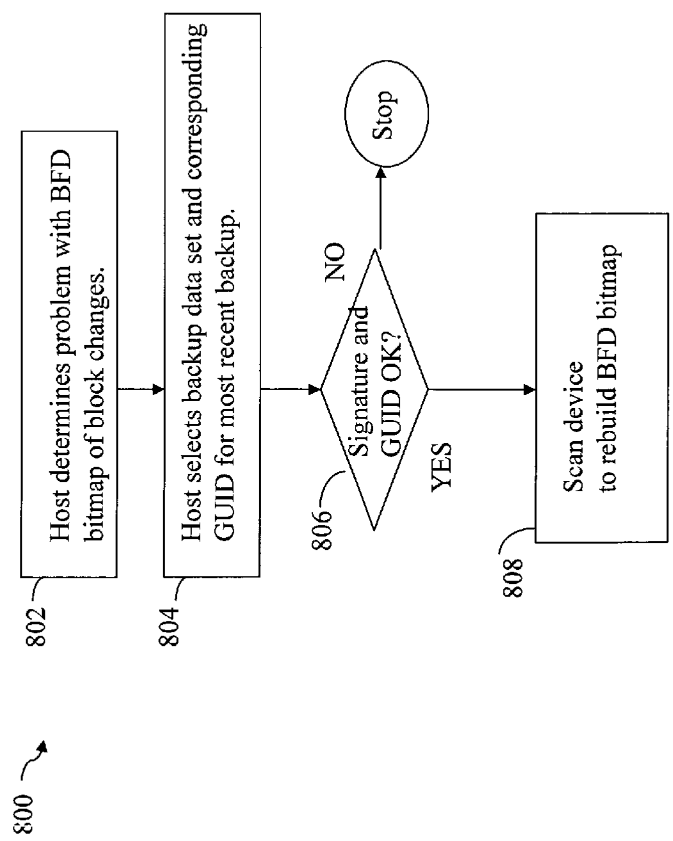
FIGS. 9 and 10 are flowcharts of processing steps that may be performed in an embodiment in connection with rebuilding the BFD bitmap.

Referring now to FIG. 9, shown is a flowchart of processing steps that may be performed by a host in connection with rebuilding a BFD bitmap. The steps of the flowchart 800 may be performed, for example, by one or more components of a host that perform recovery processing upon detecting such corruption in order to allow the host to resume normal online operations such as processing device write operations for a device using the BFD bitmap. At step 802, the host determines a problem with the BFD bitmap of recorded block changes for the device. The BFD bitmap may be, for example, the structure 120 as described elsewhere herein in connection with tracking block level changes to a device. In one embodiment, steps 804, 806 and 808 may be performed, for example, by a backup and/or restoration application on the host. At step 804, a backup data set is selected to be used in connection with rebuilding the BFD bitmap. In one embodiment, the metadata, including a list of hash values associated with the most recent backup data set for the device, may be used. It should be noted that an embodiment may also select a different backup data set than the most recent for the device associated with the BFD bitmap being rebuilt. Techniques utilizing a different backup data set are described in more detail elsewhere herein. Once the backup data set is selected, a determination is made at step 806 as to whether the previously stored digital signature and GUID of the backup data set indicate a valid list of hash values. Step 806 processing may be characterized as processing to verify or validate the list of hash values. In one embodiment in connection with step 806 processing, the host may use the digital signature to determine if the GUID and/or list of hash values has been modified and should not be trusted. The host may read the previously stored digital signature and also compute an expected digital signature in accordance with the stored list of hash values and GUID. The host may compare the previously stored digital signature and the computed expected digital signature. If the two do not match, the host may determine that the information stored for the backup data set (e.g., the list of hash values, GUID, and digital signature) should not be trusted and may have been modified. As such, failure of the digital signatures to match may cause step 806 to evaluate to no. If the previously stored and computed digital signatures match, the host may perform additional processing in connection with step 806 for the GUID and/or digital signature. The host may query the RDE appliance as to whether the GUID and/or associated digital signature match a particular version, such as the most recent version, of a backup data set for a particular host device. The host may also query the RDE appliance as to whether the digital signature and/or GUID of the selected backup data set are associated with any valid backup data set for a particular host. If any problems are detected with the GUID and/or digital signature, the foregoing may also cause step 806 to evaluate to no. Recall that the host and RDE appliance may have the same information with respect to any one or more backup data sets. As such, any backup data set stored on the host should be identifiable or verifiable using the GUID and/or digital signature by the RDE appliance. It step 806 evaluates to no, processing for rebuilding the BFD bitmap may stop and an associated error code or condition may be generated. If step 806 evaluates to yes, control proceeds to step 808 to scan the device corresponding to the BFD bitmap being rebuilt.

Figure 10:
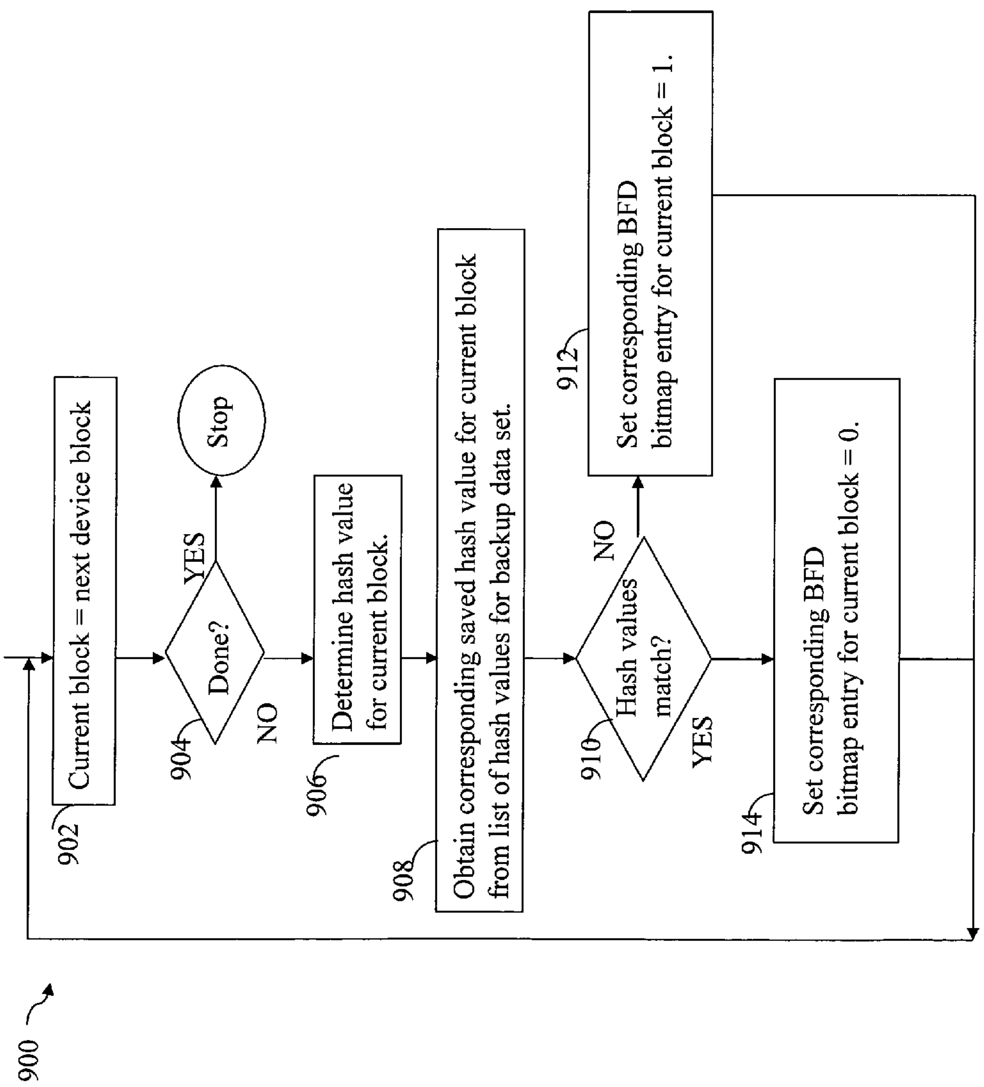

Referring now to FIG. 10, shown is a flowchart of processing steps that may be performed in an embodiment in connection with scanning a device to rebuild the BFD bitmap. The flowchart 900 provides more detailed processing of step 808 of FIG. 9 that may be performed in an embodiment. In connection with one embodiment, a single hash value may be associated with each device block. At step 902, current block is assigned the next block on the device to be scanned. At step 904, a determination is made as to whether processing of all device blocks is complete. If so, step 904 evaluates to yes and processing stops. If step 904 evaluates to yes, the BFD bitmap rebuild is complete. If step 904 evaluates to no, control proceeds to step 906 where the data for the current block is read and a corresponding hash value is computed for the data stored at the current block. At step 908, the corresponding saved hash value for the current block is retrieved from the list of hash values for the backup data set selected in step 804. At step 910, a determination is made as to whether the saved hash value and the computed hash value for the current block match. If not, control proceeds to step 912 to set the corresponding BFD bitmap entry for the current block to 1 indicating that there has been a change to the current block since the selected backup data set was performed. Control then proceeds to step 902 to continue processing for the next device block. If step 910 evaluates to yes, control proceeds to step 914 where the corresponding BFD bitmap entry for the current block is set to 0 indicating that there has been no change to the current block since the selected backup data set was performed. Control then proceeds to step 902.

Processing of the flowchart 900 continues until all the blocks of the device have been processed when step 904 evaluates to yes. At this point, the BFD bitmap has been rebuilt with respect to the selected backup data set, such as the most recent backup data set. In one embodiment in which the selected backup data set is the most recent backup data set, the host may resume data operations of the device associated with the rebuilt BFD bitmap. Block level change detection for the device may continue as write operations are processed and recorded in the BFD bitmap. The BFD bitmap may be used in connection with performing a subsequent backup operation in which only changed portions and their respective block or device locations are transmitted to the RDE appliance.

Using the foregoing processing as illustrated in FIGS. 9 and 10, the BFD bitmap structure may be reconstructed locally on a host without utilizing network bandwidth. The foregoing may be used to rebuild the BFD bitmap. The BFD bitmap may then be used in connection with performing an incremental backup of only changed or modified data portions with respect to a previous backup data set, such as the latest backup data set. Additionally, the foregoing techniques for generating a BFD bitmap may be used in connection with restoration operations as will be described in connection with following paragraphs.

In the foregoing, techniques are described for use in connection with backup operations for storing data to the RDE appliance 24 of FIG. 1. An embodiment may also perform restoration operations for retrieving data stored at the RDE appliance, such as a previous backup data set of a device. As known in the art, different types of restorations may be performed. One type of data restoration may be characterized as a complete restoration of one or more devices of a computer system such as, for example, in connection with performing site-wide disaster recovery. In connection with a complete restoration with respect to a device, data is restored to the entire device. When there is a need to perform a complete device restoration for one or more devices, the associated host or computer system may not be bootable using the standard system boot device. As a result, the host may be booted from an alternative device such as using a CD in order to begin the restoration process. When performing a complete device restoration in one embodiment, the system may be booted using an alternate boot device and a restoration application may be executed. The restoration application may be loaded from the alternate boot device and executed on the host system. The restoration application may interact with the RDE appliance to restore a selected backup data set to a device of the host. In one embodiment, the restoration application may display a list of available backup data sets previously saved on the RDE appliance such as using the backup operation techniques described herein. A user may select a particular one of the backup data sets to be restored to a host device. The restoration application then communicates with the RDE appliance by issuing a request to perform the complete restoration of the selected backup data set to the host device. The RDE appliance then transmits the backup data set to the restoration application on the host to allow for a data restoration of each data block on the host device.

Figure 11:
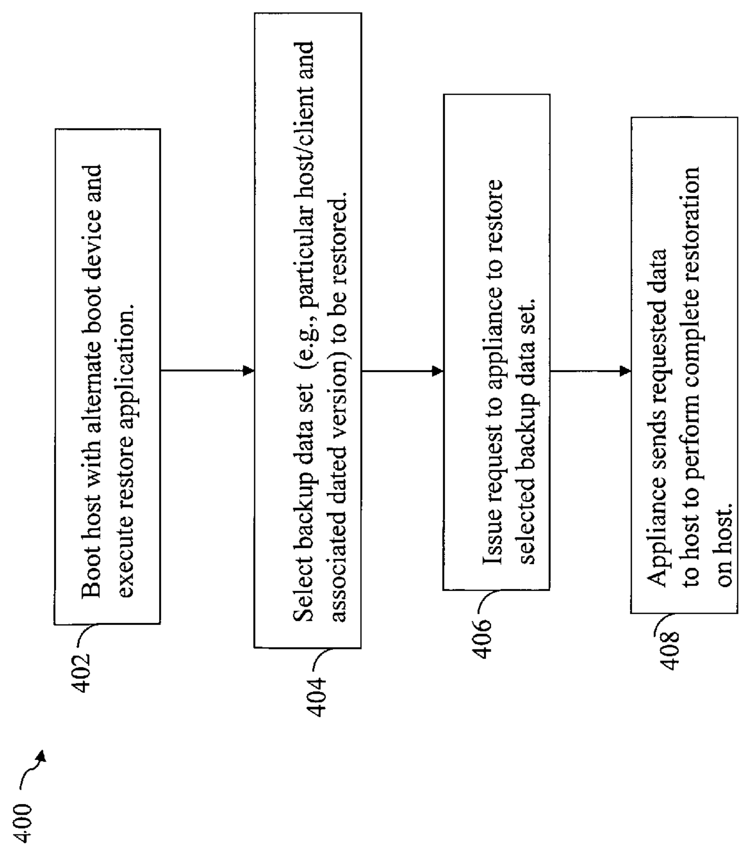
FIG. 11 is a flowchart of processing steps that may be performed in an embodiment when performing a complete restoration.

Referring now to FIG. 11, shown is a flowchart of steps that may be performed in an embodiment in connection with performing a complete device restoration. It should be noted that the processing steps of the flowchart 400 may be performed for each device to be restored including a system boot device. At step 402, the host is booted with an alternate boot device since, in this example, the host is unable to boot using the system boot device. The restoration application is loaded for execution also as part of step 402 processing using the alternate boot device. At step 404, selection of the backup data set to be restored is performed. In connection with step 404 processing, the restoration application interacts with the RDE appliance to obtain a list of one or more previously backed up data sets. Such data sets may be, for example, previous backup data sets of the device for which restoration processing is now being performed. The backup data set may be identified, for example, by the particular host, device, date of the backup, and the like. A selection of the backup data set to be restored may be made, for example, using a selection device such as a mouse connected to a display device of the host upon which the list of available backup data sets is displayed. At step 406, the restoration application issues a request to the RDE appliance to restore the selected backup data set. At step 408, the RDE appliance sends the requested data to the host to perform the complete device restoration.

In connection with performing a complete restoration of one or more host devices, the host devices and the host itself may not be available online for use until all the devices are restored. Additionally, performing a complete restoration of one or more devices can consume a large amount of system resources. At times, it may be possible to perform a partial restoration or roll back rather than a complete restoration of one or more host devices. For example, even though the host system may not capable of rebooting without use of an alternate boot device, the contents of the system device and other host devices may still be intact. It may be, for example, that a portion of the boot block on the system device has been corrupted, a virus has caused data integrity issues since the last backup, or the like. In such instances where the device to be restored may be in a state with a portion of good or reliable data residing thereon, techniques for performing a partial restoration or rollback may be desirable rather than a complete device restoration. For example, in the event a computer virus causes problems for one or more host devices, a previous backup data set of each device may be restored. The previous backup data sets from a particular date may be known to be in a good or uncompromised state, for example, such as prior to infection by the virus.

Techniques will now be described in connection with performing the partial restoration or rollback operation utilizing the BFD bitmap described elsewhere herein. Using the BFD bitmap provides for restoration of what has changed on a device since the selected backup data set, such as the most recent backup data set of a device.

Figure 12:
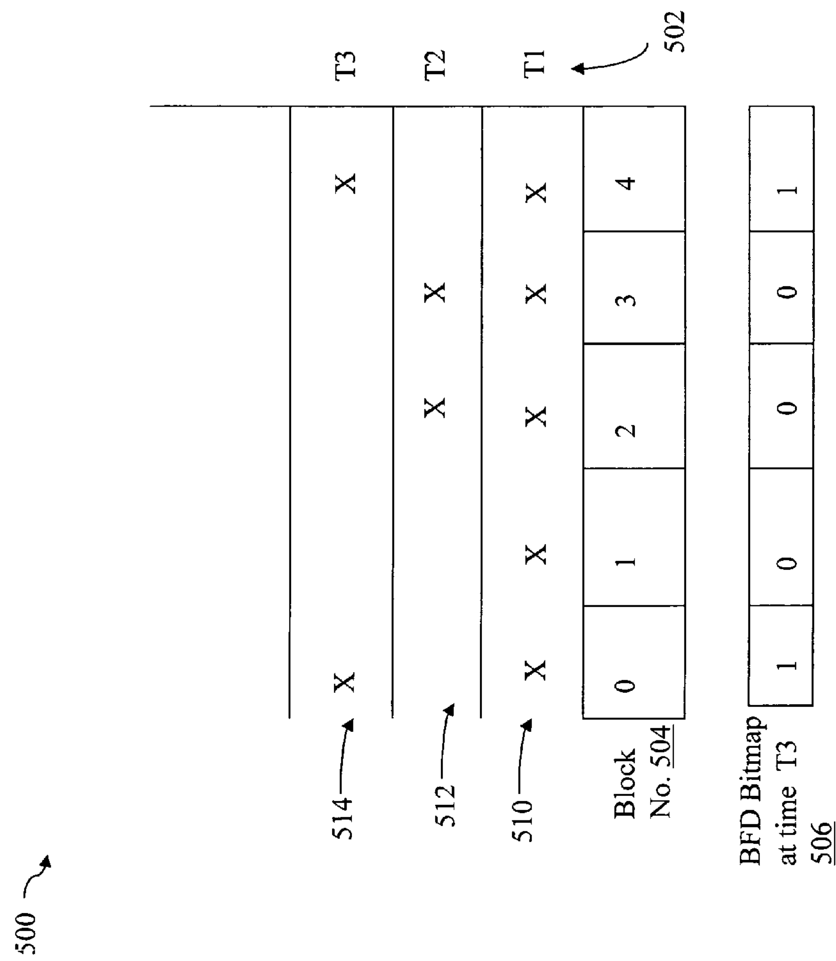
FIG. 12 is an example illustrating a partial restoration using the techniques described herein.

Referring now to FIG. 12, shown is an example illustrating use of a restoration technique that may be performed in an embodiment using the BFD bitmap. The techniques illustrated in the example 500 may be used in connection with performing a partial restoration or rollback to a selected backup data set. The example 500 includes various dates/times corresponding to a state of data on the device on the right vertical axis labeled T1, T2 and T3 as illustrated by element 502. The various blocks of the device are denoted 0 . . . 4 and accordingly labeled as illustrated by 504.

Time T1 may correspond to a first point in time at which a first backup data set for a host device is obtained. Element 510 includes an "X" associated with a block location indicating that a change has been made to the associated block. In connection with the backup data set T1 as denoted by 510, all of the blocks of data have been modified. T1 may be associated with a backup data set, for example, such as a complete or full backup. Using the backup techniques described herein when performing the backup at time T1, all the data of the device may be transmitted to the RDE appliance and a first list of hash values, associated GUID and digital signature saved on persistent storage at the host. After the T1 backup is complete, the BFD bitmap is initialized. At time T2, a second backup data set for the same host device is obtained. In connection with the backup data set T2 as denoted by 512, data blocks 2 and 3 have been modified. In accordance with the techniques described elsewhere herein, the modifications to blocks 2 and 3 may be denoted in the BFD bitmap used in connection with backing up the device data at time T2. The BFD bitmap may be used in determining which portions of the device have been modified since previous T1 backup so that only the changed data portions (e.g., blocks 2 and 3) are transmitted to the RDE appliance in connection with the T2 backup. A second set of information, including a second list of hash values, QUID and associated signature, may be saved for the T2 backup data set. After the T2 backup is complete, the BFD bitmap is initialized and used to track subsequent data block level modifications since the T2 backup. In this example, T3 may correspond to the present time and blocks 0 and 4 have been modified since the T2 backup as illustrated by the BFD bitmap at time T3, element 506, and by element 514. At time T3, a problem may occur with the device for which backups have previously been performed at times T1 and T2. As such, data for the device may be restored to a last known good or uncompromised data set, such as the backup data set obtained at time T2. The BFD bitmap at time T3 indicates which data blocks of the device have been modified since time T2 and which must be restored in order to restore the data on the device to the state at time T2. Accordingly, the BFD bitmap may be used in determining which data blocks need to be retrieved from the RDE appliance in order to restore the device to the T2 data state of the T2 backup data set. In connection with the example 500, data blocks 0 and 4 need to be retrieved to complete the restoration of the device's data to the T2 backup data set.

The restoration application may interact with other components, such as the interface component 122 or private interface 130, in a manner similar to that as described for the backup application to determine the block level changes indicated in the BFD bitmap, and perform the restoration operation with respect to the changed blocks.

In connection with the example 500 using the BFD bitmap 506, the restoration application determines that blocks 0 and 4 need to be restored. In connection with techniques described herein, the host may also store the list of hash values, GUID, and digital signature associated with the backup data set at time T2. Using the techniques described above, the host may use the digital signature and GUID to verify that the list of hash values for the T2 backup data set has not been compromised. If the list of hash values associated with the backup data set at time T2 has not been compromised, the host may determine the hash values for data blocks 0 and 4 at time T2, and sends the hash values to the RDE appliance to request the data associated with data blocks 0 and 4 at time T2. In response, the RDE appliance identifies the data blocks corresponding to the hash values, and sends the requested data to the host.

It should be noted that if the BFD bitmap was compromised or otherwise not in a useable state, other techniques described herein (e.g., such as illustrated in FIGS. 9 and 10) may be used to rebuild the BFD bitmap with respect to the T2 backup data set, the last data backup.

The foregoing illustrates use of the BFD bitmap in performing a restoration operation by restoring only those portions of data which have changed since a particular point in time. In connection with the example, techniques are illustrated for restoring those data portions which have been modified since a previous backup. The modifications are indicated at the block level by the BFD bitmap. Thus, the device may be restored to a previous data state without performing a complete restoration (e.g., without restoring all the data to the device associated with the previous data state).

It should be noted that although in the foregoing example, the selected backup data set to be restored is the latest backup, the foregoing restoration technique using the BFD bitmap may be performed with respect to any selected backup data set to be restored. The BFD bitmap may be produced with respect to the current data of a device and a selected backup data set of a device. The selected backup data set may be represented using the list of hash values as described herein.

Figure 13:
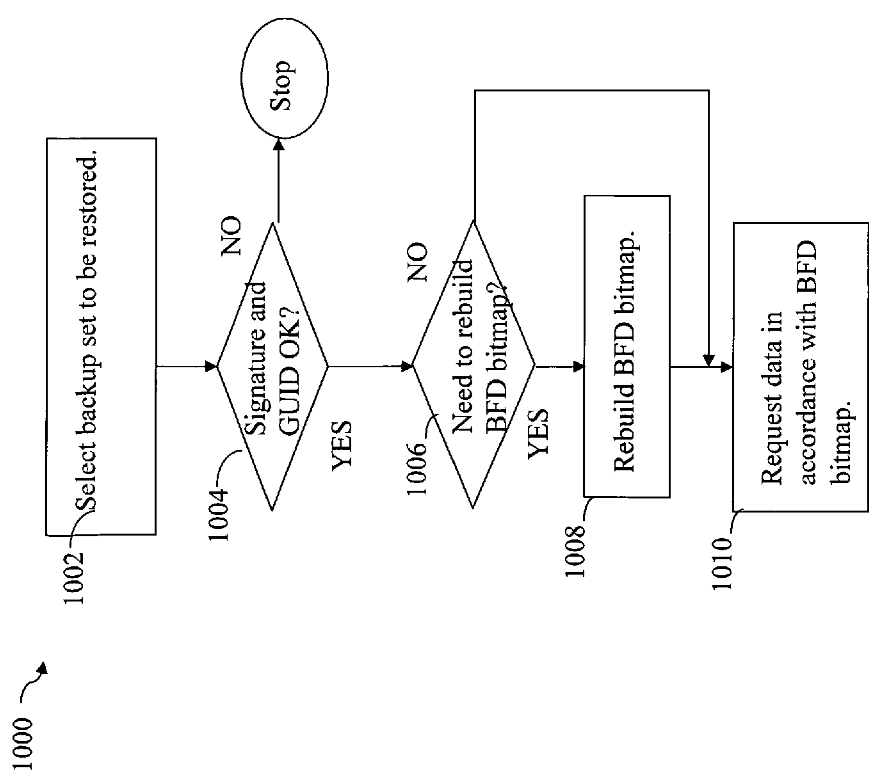
FIGS. 13, 14 and 15 are flowcharts of processing steps that may be performed in an embodiment in connection with performing restoration operations using the techniques described herein.

Referring now to FIG. 13, shown is a flowchart of processing steps that may be performed in an embodiment in connection with performing a restoration operation. The flowchart 1000 summarizes processing steps described above for performing a restoration operation with respect to a selected backup data set. The steps of flowchart 1000 may be performed by a restoration application on the host. At step 1002, the selected backup set to be restored is selected. This may be performed, for example, by the restoration application on a host displaying a list of available backup data sets. The list may identify those backup data sets for which the host has information including the list of hash values, associated GUID and signature as illustrated in FIG. 7. Once the backup data set is selected, control proceeds to step 1004 where verification or validation processing is performed to determine if the information associated with the backup data set has been compromised. As described elsewhere herein, this verification may be performed using the digital signature and/or GUID associated with the selected backup data set. In one embodiment as described elsewhere herein, for example, step 806 of FIG. 9, the digital signature is computed for the current list of hash values and GUID. The computed digital signature is compared to the stored digital signature. If the signatures do not match, the GUID and/or list of hash values may have been compromised and step 1004 evaluates to no. Besides using the digital signature, the host may utilize the GUID associated with the list of hash values. The host may query the RDE appliance for confirmation that the digital signature and/or GUID are valid identifier for a backup data set. If the RDE appliance does not confirm the validity of the GUID and/or digital signature associated with the selected backup data set, step 1004 evaluates to no. Based on the foregoing step 1004 may evaluate to no if verification processing fails with respect to one or more of the digital signature and the GUID associated with the selected backup data set.

If step 1004 evaluates to no, restoration processing stops. An embodiment may also perform error processing or otherwise terminate restoration processing with an error condition. If step 1004 evaluates to yes, control proceeds to step 1006 where a determination is made as to whether the BFD bitmap needs to be rebuilt. The BFD bitmap may be rebuilt if the current BFD bitmap has been compromised or is otherwise not usable. The BFD bitmap may be rebuilt if the selected backup set to be restored is a backup set other than the most recent backup set. An existing BFD bitmap reflects changes since the last backup. Accordingly, if the selected backup set is any one other than the latest backup, the BFD bitmap may be reconstructed to reflect differences between the current device data and the selected backup data set. If step 1006 evaluates to yes, control proceeds to step 1008 to rebuild the BFD bitmap. Processing at step 1008 is similar to processing described elsewhere herein, for example, in connection with step 808 of FIG. 9 and as set forth in more detail in the flowchart of FIG. 10. Once the BFD bitmap reflects the changed data blocks with respect to the selected backup data set, control proceeds to step 1010 to request the data to be restored in accordance with the BFD bitmap. If step 1006 evaluates to no, control proceeds to step 1010.

As part of step 1010 processing, the restoration application executing on the host may request the changed data portions in accordance with the BFD bitmap. The restoration application may determine the hash values in the hash list corresponding to the modified data blocks to be restored. The restoration application may request the data blocks by specifying the particular hash values corresponding to the changed data blocks. The RDE appliance may receive the request and send the requested data blocks having the hash values to the host.

Figure 13A:
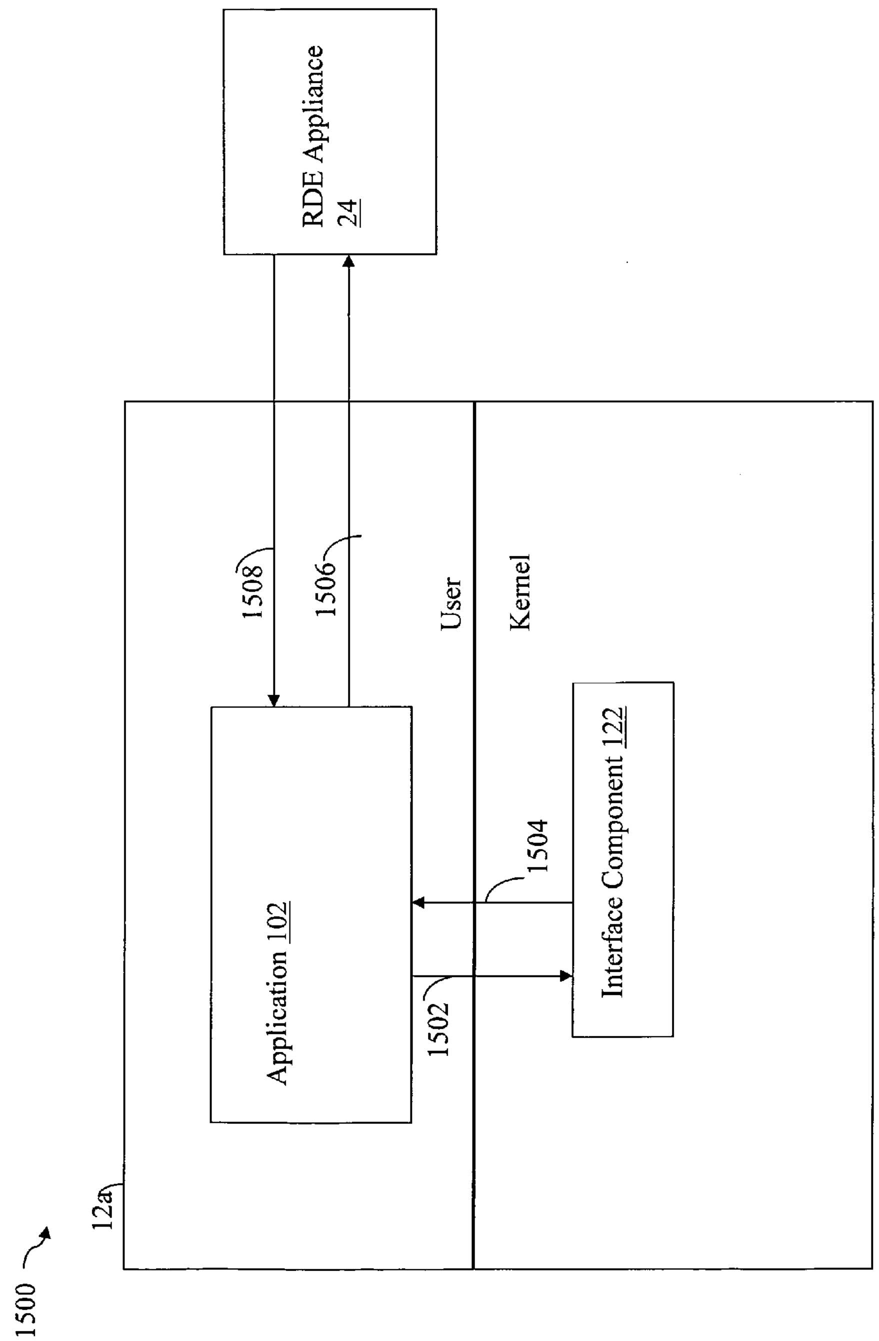
FIG. 13A is an example illustrating data flow between components in connection with a restoration operation.

Referring now to FIG. 13A, shown is an example of an embodiment illustrating data flow between the host and the RDE appliance in connection with performing a restoration operation. The example 1500 is illustrated for a single host 12*a* but may also be applicable for use with other hosts of the system 10 of FIG. 1. In connection with a restoration operation, the application 102 may be a restoration application that determines the data portions, such as data blocks, to be restored. The application 102 may determine the data blocks to be restored by querying another component, such as the interface component 122 illustrated by element 1502, for the data blocks indicated by the BFD bitmap indicating those data blocks which have been modified with respect to a selected backup data set. The data blocks may be those indicated by the BFD bitmap to have been changed or modified with respect to a selected backup data set. As indicated by 1504, the data blocks which have been changed may be communicated to the application 102. The application 102 may obtain the hash values for the data blocks that need to be restored, for example, from the list of hash values of the selected backup data set to be restored. The application 102 may communicate the hash values of the data blocks to be restored to the RDE appliance 24 as illustrated by 1506. In response, the RDE appliance 24 may return the data blocks requested as illustrated by 1508.

It should be noted that as described in connection with the backup application, the restoration application may utilize the private interface 130 that may be included in an embodiment to obtain changed data block information. As such, the private interface 130 may be used an alternative to the component 122 illustrated in FIG. 13A when performing restoration operations.

In connection with performing a complete restoration of a device on a host such as, for example, in the event of a site disaster, the host and its system device may not be usable or otherwise online and available until the system device of the host has been completely restored. In other words, the host may not be bootable and brought online for use until restoration is complete for at least the host's system device (e.g., the system device including the boot block used to boot the host). Using techniques described in following paragraphs, the amount of time to when the host is bootable and when the host device may be used is reduced.

To facilitate the foregoing, processing may be performed each time the host is booted such as from the system device. In one embodiment, the host may be booted to a point in the boot process which may be characterized as a minimally operational state. In this state, the host has limited functionality. For example, the system may be in a state in which only applications and operations deemed critical are functional. As part of this process in booting the host from the system boot device to bring the host into the minimally operational state, the BFD is loaded and executes. As the boot blocks are read in from the system boot device, the BFD records which blocks are read and utilized. At a later point in the boot process to place the host in the minimally operational state, one or more applications used in connection with the RDE appliance (e.g., RDE host-side applications), such as the backup and/or restoration application, are loaded and executed. The RDE host side application may then communicate, directly or indirectly (e.g., through a call stack with other drivers or routines), with the BFD to instruct the BFD to stop recording which boot blocks are used. The application then requests the list of boot blocks as recorded by the BFD that were used during the booting process. The application may then persistently store the recorded list of boot blocks on the host and associate the list of boot blocks with the next backup data operation. In connection with the next backup data operation performed in one embodiment, the list of recorded boot blocks may be included in the backup data set sent to the RDE appliance.

Subsequently, when performing a complete restoration operation for a previously stored backup data set on the RDE appliance, (e.g., such as a previous backup of the host's system device), the RDE appliance may restore the data blocks associated with the list of boot blocks prior to restoration of other portions of the host device. The data, including the data associated with the boot process, may be restored on a per file basis. As such, if any one data block of a file is recorded by the BFD as used during the boot process, the file may be determined as used during the boot process. The RDE appliance may determine which data blocks correspond to the files used during the boot process as recorded by the BFD. It should be noted that the information as to what blocks are included in what files may have been included in information saved to the RDE appliance in connection with the selected data backup being restored. The RDE appliance then sends these data blocks corresponding to the files used during the boot process prior to restoring other data to the host. The host may then be booted using the restored boot files of its restored system device. The remaining portions of the system device, as well as other devices, may be subsequently restored using a background process and/or restored on demand as needed. The host may be used while the remaining data is restored to the host.

As described elsewhere herein in connection with a complete restoration of a host device including the boot files, the host may be booted using an alternate boot device prior to beginning the device restoration operation. The host may be booted to the foregoing minimally operational state when booting from the alternate boot device. As such when in this state, the restoration application may be executing on the host to perform the restoration operation of a selected backup data set. The restoration application may then request a complete restoration of the selected backup data set from the RDE appliance. The RDE appliance may perform a complete restoration of the selected data set but send those files previously identified as containing blocks used during the boot process prior to sending other data.

Using the foregoing techniques, the restoration is performed by prioritizing the data to be restored in connection with a complete restoration operation of the host device. In the foregoing, when restoring the host device containing the boot files, the boot files used may be restored first. The remaining portions of the host device, as well as other devices, may then be performed using one or more techniques. An embodiment may restore the remaining portions using a restoration process operating as a background task, for example, in which the remaining portions are restored when the host is not busy performing other operations (e.g., a processor of the host is idle). The background task or process may copy the remaining portions, for example, in order of increasing data block number of the device. An embodiment may also restore the remaining portions "on demand" or in response to a use by the host. For example, the host may request from the RDE appliance and restore data for a particular data block when an I/O operation for the data block is received at the host. An embodiment may use one or both of the foregoing techniques, alone or in combination with other techniques, in connection with completing the restoration operation for the one or more host devices.

Figure 14:
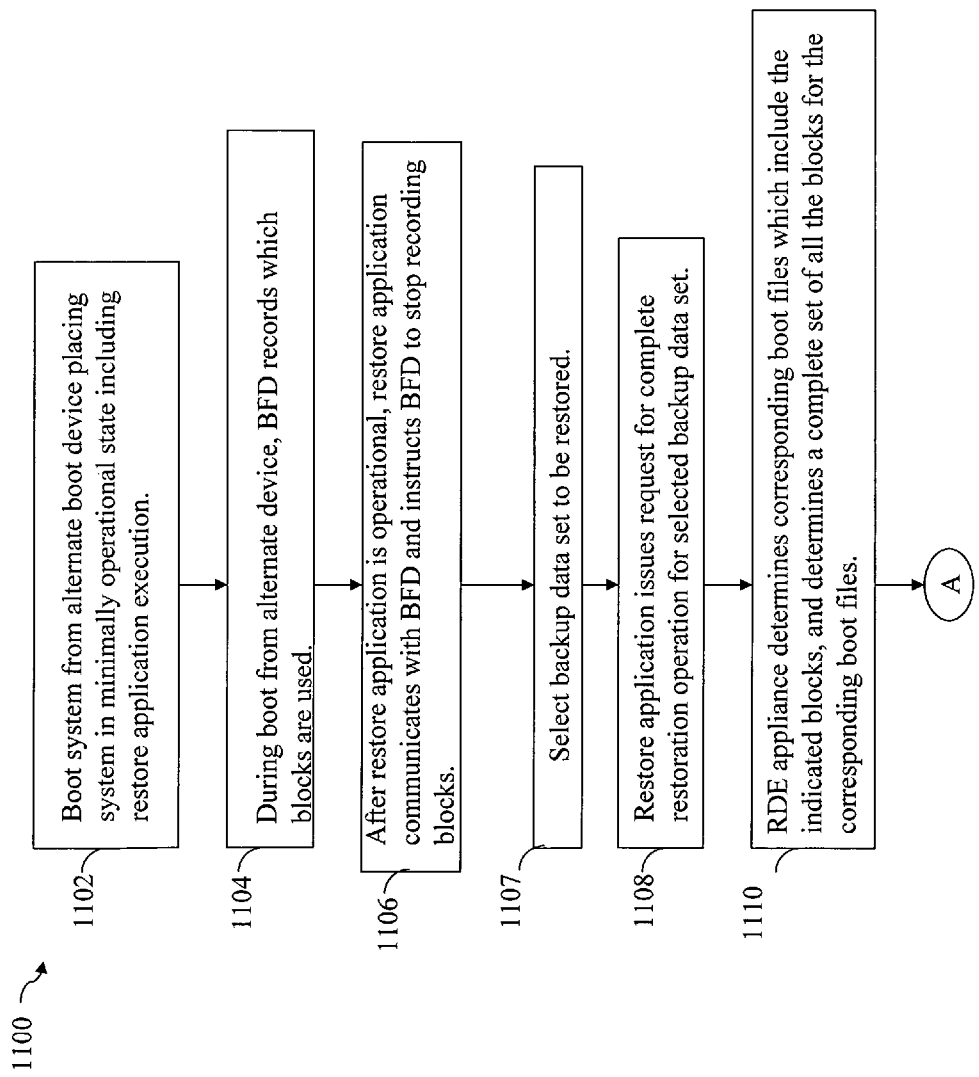
Figure 15:
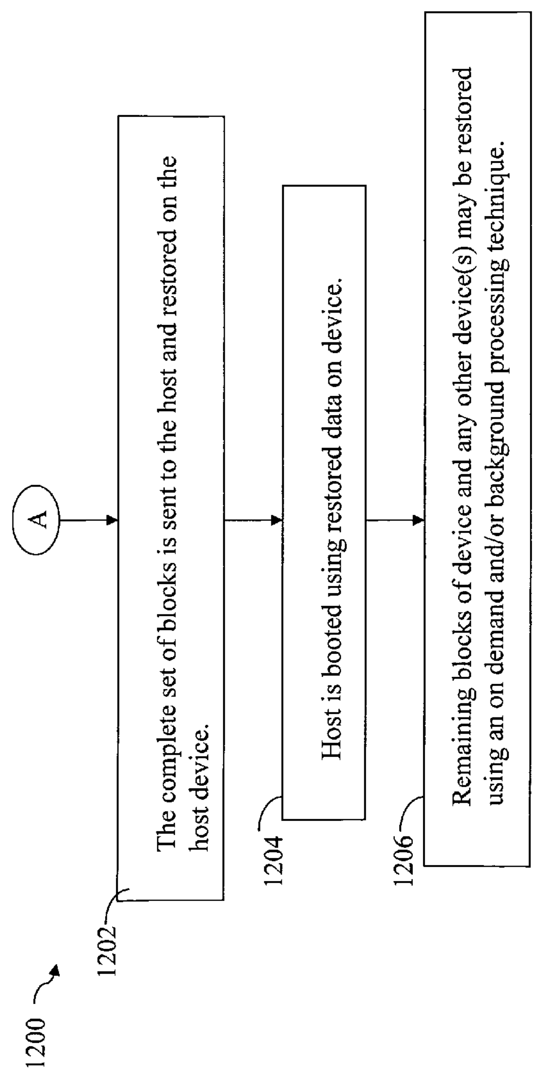

Referring now to FIGS. 14 and 15, shown are flowcharts of processing steps that may be performed in an embodiment in connection with performing a complete restoration of a host. Prior to execution of the flowcharts of FIGS. 14 and 15, one or more backup data sets each having an associated list of boot blocks may be created and stored on the RDE appliance. The processing described above of recording the blocks used during the boot process (e.g., the list of boot blocks) may be performed each time the host is booted and the list stored to the RDE appliance in connection with a subsequent backup operation and resulting backup data set. The steps of flowcharts 1100 and 1200 summarize processing just described above with respect to performing a restoration operation. At step 1102, the host may be rebooted from an alternate boot device to place the host in a minimally operational state in which the BFD and restoration application are operational. At step 1104, as part of the process of booting the host from the alternate device, the BFD becomes operational and records which boot blocks are used during the booting process. As described herein in one embodiment, steps 1104 and 1106 may be performed each time the host is booted from the host system device as well as an alternate boot device. At step 1106, at a later point in the process of booting the host from the alternate device, the restoration application becomes operational and communicates with the BFD and instructs the BFD to stop recording the blocks used. At step 1107, a selection is made as to which backup data set is to be restored. The restoration application may obtain a list of available backup data sets to be restored from the RDE appliance. The backup data set selected may be for a particular host, host device, date, and the like. At step 1108, the restoration application sends a request to the RDE appliance to perform a complete restoration of the selected backup data set. The request may identify the restoration as a complete restoration causing the RDE appliance to restore blocks of the boot files prior to other data portions as requested from the host. At step 1110, the RDE appliance determines the data associated with the selected backup data set. The data may include the list of boot blocks as previously stored in connection with a backup operation for the selected backup data set. The RDE appliance determines the corresponding boot files which include the boot blocks recorded as used by the BFD. The RDE appliance also determines a complete set of all blocks for the corresponding boot files. If one or more blocks of a file are used during the boot process, the file is deemed to be used during the boot process. Step 1110 determines the data blocks of each of these files used during the boot process. At step 1202, the complete set of blocks associated with the boot files is sent to the host and restored on the host device. At step 1204, the host is booted using the restored boot files on the host device. At step 1206, the remaining blocks are restored to the device and any other host devices using an "on-demand" technique and/or background processing technique as described above. In connection with these techniques, the host may request from the RDE appliance data associated with a particular data block of the backup data set being restored.

Using the foregoing, the blocks of the host device needed to bootstrap the operating system and critical applications may be restored first to allow the host operating system to boot. Subsequently, the host may be booted and the remaining blocks of one or more host devices may be restored. Use of the BFD provides for dynamic boot block discovery as the host is booting from the alternate device. This boot block discovery information may be used to prioritize an order indicating which portions of the host data are restored first.

In connection with techniques described herein, a restoration application executing on a host may use the metadata, such as the hash values, of a previously captured data set. The metadata may be stored locally on each host for one or more previously captured or backed up data sets. The metadata may be associated with a GUID and digital signature to ensure data integrity of the metadata. A determination may be made as to how a current set of data on a device differs from a previously captured set of data (e.g., previous backup data set for the device) using the metadata for the previously captured set of data. This determination may be performed locally on each host by a restoration application by determining hash values for each data block on the device and comparing these hash values to corresponding data block hash values of the previously captured set of data. The differences between hash values for each data block may be indicated in the BFD bitmap. Using the BFD bitmap in connection with a restoration operation, a host may determine which blocks of a device have to be updated to restore the device to a previous state associated with a previous backup data set for the device. The determination regarding the current state of the device with respect to a previously captured data set for the device from a prior point in time may be performed using the techniques herein without using network resources or resources of the RDE appliance. Subsequently, each host may request restoration of only those changed portions, such as data blocks, represented using hash values or other tokens as indicated in accordance with the BFD bitmap.

Such techniques described herein are scaleable. For example, when restoring an entire workgroup including many hosts and other systems after a site-wide failure or disaster, the contents of each device of each system may be unknown. Getting all devices of each system of the workgroup into a known state in a timely fashion while limiting network bandwidth, or physically having to be at each system may be difficult. Using the techniques described herein, each system to be restored may have a local restoration application which scans the entire set of devices of the system. While scanning, the restoration application may determine the hash values for each fixed size data portion, such as a data block on the device. The BFD bitmap may be updated to indicate which portions of the device need to be restored to return the device to a previously known data state, such as associated with a previous backup data set for the device. If it is determined that a hash value of a data block differs from a hash value of a previously captured data set representing a known data state of the device, the BFD bitmap may updated to indicate this detected difference. Changed data blocks in accordance with the BFD bitmap may be requested in connection with a restoration operation to restore the device to the known data state. Using these techniques described herein allows device scans to proceed locally and in parallel across all systems that need to be restored.

It should be noted that in connection with performing a restoration operation, an embodiment may have the host traverse the BFD bitmap and request each needed data block to be restored. Alternatively, an embodiment may also send the BFD bitmap to the RDE appliance and have the RDE appliance perform the traversal of the BFD bitmap and accordingly send the indicated data blocks to the requesting host.

The restoration techniques used herein may also provide for performing a restoration operation for a client, such as the host, to restore a backup data set version other than one for which the client has the associated hash value list. For example, the host may only retain the latest version of a backup data set and thus only the latest associated hash value list. It may be that the client wishes to restore to a second different version of the data set other than the most recent. The RDE appliance may have the associated backup data set for the selected second different version to be restored, but the host may not have the hash value list for the selected second version. In such instances, the client may determine the BFD bitmap with respect to the hash value list for the most recent version. The client may send this BFD bitmap to the RDE appliance. The RDE appliance may use the bitmap to determine any additional changes needed to perform a restoration with respect to the second selected version.

It should be noted that an embodiment may utilize any one or more of the techniques described herein alone, or in combination with, other techniques. One embodiment may utilize the techniques described herein in connection with a single instance storage (SIS) technique as well as one or more other techniques for data protection. For example, an embodiment may utilize the techniques herein in connection with a planned redundancy technique such as a RAID technique, a technique using erasure codes, and other replication techniques. It should be noted that use of SIS techniques provides for elimination or unintended redundancy with respect to stored data and use of a technique for data protection may provide for a planned data redundancy in the event of a data device failure. An embodiment may utilize the techniques herein with SIS techniques in combination with a data protection technique, for example, having planned redundancy in the event of a device failure.

It should be noted that although the techniques described herein may be performed for illustration purposes with respect to data of a device, it will be appreciated by those skilled in the art that techniques described herein may also be used in connection with other data segments of varying sizes and entities, such as a portion of a device, one or more files, and the like. For example, the use of the list of hash values, GUID and signature may be used in connection with a representation of a data segment corresponding to one or more files, or other data partition besides a device. Similarly, techniques described herein using the list of hash values, GUID and signature may also be used in connection with performing data operations, such as restoration operations, with a data segment corresponding to a data partition other than a complete device.

In connection with the techniques used herein, the granularity associated with each hash value may be the same or different from the granularity associated with each entry in the BFD bitmap. In one embodiment as described herein, each hash value may correspond to one data block of a specified size. Similarly, an entry for each data block of the specified size may be included in the BFD bitmap. In another embodiment, each hash value may correspond to multiple blocks of data, each block of data having a bit in the BFD bitmap. For example, a hash value may be produced for each 8 KB block. Each entry in the BFD bitmap may correspond to a 4 KB portion. As such, in connection with the techniques herein, for example, when reconstructing the BFD bitmap, the data is scanned 8 KB at a time. A hash value for the 8 KB portion is determined and compared to the respective hash of a selected hash list associated with a previous backup data set. If the hash values differ, two bits of the BFD bitmap corresponding to the 8 KB portion are set since each hash value corresponds to two 4 KB portions (e.g., the hash value granularity is some multiple "n" of the size granularity of each bitmap entry, "n">1).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of representing a data segment comprising:
- receiving a list of one or more tokens representing one or more data portions included in the data segment;
- receiving a unique identifier uniquely identifying said data segment from other data segments;
- receiving a signature value determined using said list of tokens and said unique identifier by digitally signing said list of tokens and said unique identifier;
- storing said list of tokens, said unique identifier, and said signature value as information corresponding to said data segment at a first point in time; and
- performing processing at a second point in time subsequent to the first point in time to rebuild a bit map tracking changes for the data segment since said first point in time, said processing further including:
  - performing first verification processing of said list of tokens using said unique identifier and said signature value; and
  - if said first verification processing is successful, performing second processing for each data portion of the data segment at the second point in time, said second processing including determining a current token for said each data portion, determining whether the current token for said each data portion at the second point in time matches a first of the tokens from the list corresponding to said each data portion at the first point in time, and setting an entry in the bit map for said each data portion to zero (0) if the current token has a matching first token from the list at the first point in time and setting the entry to one (1) otherwise.

2. The method of claim 1, wherein each of said tokens represents data located at a particular location in said data segment.

3. The method of claim 2, wherein each of said tokens is a hash value determined using the data located at the particular location.

4. The method of claim 1, wherein each of said data portions corresponds to a fixed size of one or more data blocks of a storage device.

5. The method of claim 1, wherein said signature value is a digital signature having a value, and the method comprising:
- performing verification processing of said list of tokens using at least one of said unique identifier and said signature; and
- using said list of tokens in connection with a data operation for said data segment if said verification processing is successful.

6. The method of claim 5, wherein said data operation is at least one of: a data synchronization operation and a restoration operation.

7. The method of claim 6, wherein said data synchronization operation includes determining a current data state of said data segment by comparing data currently included in said data segment to a previous representation of said data segment from a different point in time.

8. The method of claim 7, wherein said restoration operation includes performing said data synchronization operation and restoring said data segment to said previous representation.

9. The method of claim 7, further comprising:
- for each of said data portions of said data segment, determining whether a first token having a first value determined using first data currently comprising said each data portion is different from a second token having a second value determined using second data corresponding to said each data portion of said previous representation.

10. The method of claim 5, further comprising:
- determining that at least one of said list of one or more tokens and said unique identifier has been compromised if said verification processing fails.

11. The method of claim 1, wherein said data segment is data from a client backed up to a server, said information corresponding to said data segment representing a backup of said data segment of said client at a point in time, and the method further comprising:
- sending data included in said data segment from said client to said server;
- determining, by said client, said list of one or more tokens and sending said list to said server;
- determining, by said server, said unique identifier;
- sending said unique identifier to said client; and
- determining, by said client, said signature.

12. The method of claim 11, further comprising:
- performing a restoration operation for said data segment to said client to restore said data segment to a data state corresponding to said list of tokens, said performing including:
  - performing verification processing of said list of tokens using at least one of said unique identifier and said signature;
  - determining differences between data currently comprising said data segment and other data representing said data state corresponding to said list of tokens; and restoring data portions of said data segment determined to include data that is currently different from other data represented by said list of tokens.

13. The method of claim 12, wherein said performing verification processing and said determining differences are performed by said client, and said determining differences is performed on said client without interaction with said server from which said data is restored in connection with said restoring.

14. A non-transitory computer readable medium comprising code stored thereon for representing a data segment, the computer readable medium comprising code for:

receiving a list of one or more tokens representing one or more data portions included in the data segment;

receiving a unique identifier uniquely identifying said data segment from other data segments;

receiving a signature value determined using said list of tokens and said unique identifier by digitally signing said list of tokens and said unique identifier;

storing said list of tokens, said unique identifier, and said signature value as information corresponding to said data segment at a first point in time; and performing processing at a second point in time subsequent to the first point in time to rebuild a hit map tracking changes for the data segment since said first point in time, said processing further including:

first verification processing of said list of tokens using said unique identifier and said signature value; and if said first verification processing is successful, performing second processing for each data portion of the data segment at the second point in time, said second processing including determining a current token for said each data portion, determining whether the current token for said each data portion at the second point in time matches a first of the tokens from the list corresponding to said each data portion at the first point in time, and setting an entry in the bit map for said each data portion to zero (0) if the current token has a matching first token from the list at the first point in time and setting the entry to one (1) otherwise.

15. The non-transitory computer readable medium of claim 14, wherein each of said tokens represents data located at a particular location in said data segment, each of said tokens is a hash value determined using the data located at the particular location, and each of said data portions corresponds to a fixed size of one or more data blocks of a storage device.

16. The non-transitory computer readable medium of claim 14, wherein said signature value is a digital signature having a value, and the computer readable medium comprising code for:

performing verification processing of said list of tokens using at least one of said unique identifier and said signature; and using said list of tokens in connection with a data operation for said data segment if said verification processing is successful, wherein said data operation is at least one of: a data synchronization operation and a restoration operation.

17. The non-transitory computer readable medium of claim 16, wherein said data synchronization operation includes determining a current data state of said data segment by comparing data currently included in said data segment to a previous representation of said data segment from a different point in time.

18. The non-transitory computer readable medium of claim 17, wherein said restoration operation includes performing said data synchronization operation and restoring said data segment to said previous representation.

19. The non-transitory computer readable medium of claim 17, further comprising code for:

for each of said data portions of said data segment, determining whether a first token having a first value determined using first data currently comprising said each data portion is different from a second token having a second value determined using second data corresponding to said each data portion of said previous representation.

20. The non-transitory computer readable medium of claim 14, wherein said data segment is data from a client backed up to a server, said information corresponding to said data segment representing a backup of said data segment of said client at a point in time, and the computer readable medium further comprising code for:

sending data included in said data segment from said client to said server;

determining, by said client, said list of one or more tokens and sending said list to said server;

determining, by said server, said unique identifier;

sending said unique identifier to said client;

determining, by said client, said signature; and performing a restoration operation for said data segment to said client to restore said data segment to a data state corresponding to said list of tokens, said performing including:

performing verification processing of said list of tokens using at least one of said unique identifier and said signature;

determining differences between data currently comprising said data segment and other data representing said data state corresponding to said list of tokens; and restoring data portions of said data segment determined to include data that is currently different from other data represented by said list of tokens.

* * * * *